US011759035B2

(12) United States Patent
Aldous et al.

(10) Patent No.: US 11,759,035 B2
(45) Date of Patent: Sep. 19, 2023

(54) SILICONE FOOD AND BEVERAGE STORAGE CONTAINERS

(71) Applicant: Instant Brands Holdings Inc., Downers Grove, IL (US)

(72) Inventors: Tania Aldous, Niles, IL (US); Alfonse Drechsler, III, Downers Grove, IL (US); David Knott, Sydney (AU); Philip Rose, San Francisco, CA (US)

(73) Assignee: Instant Brands Holdings Inc., Downers Grove, IL (US)

( * ) Notice: Subject to any disclaimer, the term of this patent is extended or adjusted under 35 U.S.C. 154(b) by 39 days.

(21) Appl. No.: 17/572,797

(22) Filed: Jan. 11, 2022

(65) Prior Publication Data
US 2022/0218133 A1     Jul. 14, 2022

Related U.S. Application Data

(60) Provisional application No. 63/235,550, filed on Aug. 20, 2021, provisional application No. 63/154,316, (Continued)

(51) Int. Cl.
*A47G 19/22*  (2006.01)
*B65D 47/12*  (2006.01)
(Continued)

(52) U.S. Cl.
CPC .......... *A47G 19/2272* (2013.01); *A61J 9/005* (2013.01); *B65D 25/2885* (2013.01);
(Continued)

(58) Field of Classification Search
USPC ...................................................... 222/212
See application file for complete search history.

(56) References Cited

U.S. PATENT DOCUMENTS 2,673,661 A * 3/1954 Barton ................... B65D 47/18
222/215
4,053,648 A * 10/1977 Schmid ..................... A61J 9/00
215/11.1
(Continued)

FOREIGN PATENT DOCUMENTS

CA          1131595 A     9/1982
CA          2123005 A1    6/1993
(Continued)

OTHER PUBLICATIONS

International Search Report and Written Opinion for International Patent Application No. PCT/US22/11900 dated Jun. 7, 2022, 20 pgs.
(Continued)

*Primary Examiner* — Paul R Durand
*Assistant Examiner* — Michael J. Melaragno
(74) *Attorney, Agent, or Firm* — Crowell & Moring LLP

(57) ABSTRACT

A storage container includes an elastomeric base having a plurality of side walls forming an interior and an opening at an upper edge of the base. The base has an annular channel positioned proximate the opening at the upper edge of the base. An inner insert is removably positionable in the opening of the base, the inner insert having an outward facing annular protrusion configured for insertion in the annular channel of the base, and a spout with a channel formed therethrough. At least a portion of the spout has external threading. An outer cap is positionable over the inner insert and has an opening for receiving the spout. A screw cap includes internal threading configured for rotational engagement with the external threading of the spout, wherein rotation of screw cap compresses at least a portion of the base between the inner insert and the outer cap.

32 Claims, 38 Drawing Sheets

Related U.S. Application Data filed on Feb. 26, 2021, provisional application No. 63/136,365, filed on Jan. 12, 2021.

(51) Int. Cl.
  *B65D 47/08* (2006.01)
  *B65D 25/28* (2006.01)
  *A61J 9/00* (2006.01)
  *B65D 51/24* (2006.01)

(52) U.S. Cl.
  CPC ....... *B65D 47/0842* (2013.01); *B65D 47/123* (2013.01); *B65D 51/246* (2013.01)

(56) References Cited

U.S. PATENT DOCUMENTS

| | | | |
|---|---|---|---|
| 4,241,865 A | 12/1980 | Ferrell | |
| 5,024,536 A | 6/1991 | Hill | |
| 5,261,532 A | 11/1993 | Fauci | |
| 5,361,947 A * | 11/1994 | Lifshey | B65D 47/18 |
| | | | 206/532 |
| 5,462,101 A * | 10/1995 | Mouchmouchian | |
| | | | B65D 77/245 |
| | | | 141/366 |
| 5,520,463 A | 5/1996 | Tilman | |
| 5,816,709 A | 10/1998 | Demus | |
| 5,857,592 A | 1/1999 | Hyldgaard et al. | |
| 5,881,926 A * | 3/1999 | Ross | A61J 7/0023 |
| | | | 141/114 |
| 5,882,117 A | 3/1999 | Laffon | |
| 5,908,245 A | 6/1999 | Bost et al. | |
| 6,045,264 A | 4/2000 | Miniea | |
| 6,048,100 A | 4/2000 | Thrall et al. | |
| 6,088,887 A | 7/2000 | Bois | |
| 6,102,254 A * | 8/2000 | Ross | A61P 43/00 |
| | | | 141/114 |
| 6,318,626 B1 | 11/2001 | St. Pierre et al. | |
| 6,345,911 B1 | 2/2002 | Young et al. | |
| 6,446,847 B1 | 9/2002 | Huffer | |
| 6,579,008 B2 | 6/2003 | Price et al. | |
| 6,767,131 B2 | 7/2004 | Taheri | |
| 6,783,276 B2 | 8/2004 | Machacek et al. | |
| 6,857,779 B2 | 2/2005 | Olin | |
| 6,921,203 B2 | 7/2005 | Versluys | |
| 7,144,159 B2 | 12/2006 | Piotrowski et al. | |
| 7,204,641 B2 | 4/2007 | Stolmeier | |
| 7,223,017 B2 | 5/2007 | Weaver | |
| 7,625,119 B2 | 12/2009 | Szczesuil et al. | |
| D617,654 S | 6/2010 | Tawinsook | |
| D634,645 S | 3/2011 | LaFauci et al. | |
| 7,946,766 B2 | 5/2011 | Dais et al. | |
| D642,069 S | 7/2011 | LaFauci et al. | |
| 7,976,220 B2 | 7/2011 | Brauer et al. | |
| 8,070,359 B2 | 12/2011 | Taheri | |
| D660,179 S | 5/2012 | Bray | |
| 8,376,614 B2 | 2/2013 | Pawloski et al. | |
| 8,439,228 B1 * | 5/2013 | Graham | B65D 47/265 |
| | | | 222/545 |
| 8,449,186 B2 | 5/2013 | Bray | |
| 8,591,109 B2 | 11/2013 | Ackerman et al. | |
| D694,647 S | 12/2013 | Hermes et al. | |
| 8,641,279 B2 | 2/2014 | Ichikawa et al. | |
| 8,690,428 B2 | 4/2014 | Kruse et al. | |
| D709,383 S | 7/2014 | Murray | |
| D712,206 S | 9/2014 | Ostroy | |
| 8,870,458 B2 | 10/2014 | La Fuente et al. | |
| 9,011,006 B2 | 4/2015 | Goto et al. | |
| 9,174,774 B2 | 11/2015 | Peplinski | |
| 9,193,510 B2 | 11/2015 | Mohammed et al. | |
| D751,416 S | 3/2016 | Halverson, III et al. | |
| D752,992 S | 4/2016 | Halverson, III et al. | |
| D752,993 S | 4/2016 | Halverson, III et al. | |
| D753,444 S | 4/2016 | Denis | |
| D770,916 S | 11/2016 | Nouri et al. | |
| 9,487,333 B2 | 11/2016 | VanLoocke et al. | |
| 9,505,531 B2 | 11/2016 | Chapek | |
| 9,516,927 B2 | 12/2016 | Turvey et al. | |
| 9,604,759 B2 | 3/2017 | Mitsui et al. | |
| D789,215 S | 6/2017 | McGuire et al. | |
| 9,682,802 B2 | 6/2017 | McDonough | |
| D790,986 S | 7/2017 | Babcock | |
| D812,488 S | 3/2018 | Chang et al. | |
| 9,938,046 B2 | 4/2018 | Kujat | |
| 10,000,033 B2 | 6/2018 | Denis et al. | |
| D821,888 S | 7/2018 | Murray | |
| D828,180 S | 9/2018 | Sam | |
| 10,106,299 B2 | 10/2018 | Luizzi et al. | |
| 10,106,301 B2 | 10/2018 | Schulz et al. | |
| D838,188 S | 1/2019 | Utter | |
| D840,835 S | 2/2019 | Tan | |
| 10,220,982 B2 | 3/2019 | Albers | |
| 10,232,970 B2 | 3/2019 | Verma | |
| 10,232,984 B2 | 3/2019 | Leeker et al. | |
| 10,258,082 B2 | 4/2019 | Süss et al. | |
| 10,258,125 B1 | 4/2019 | Cohen | |
| D854,940 S | 7/2019 | Estlinbaum et al. | |
| D854,941 S | 7/2019 | Hryhoriiovych | |
| 10,407,217 B1 | 9/2019 | Nouri et al. | |
| 10,414,548 B2 | 9/2019 | Liu | |
| 10,427,839 B2 | 10/2019 | Johnston | |
| 10,472,103 B2 | 11/2019 | Durow | |
| D873,075 S | 1/2020 | Finell et al. | |
| D873,083 S | 1/2020 | Finell et al. | |
| D873,084 S | 1/2020 | Finell et al. | |
| D874,876 S | 2/2020 | Finell et al. | |
| D876,172 S | 2/2020 | Finell et al. | |
| D876,217 S | 2/2020 | Nouri et al. | |
| D876,891 S | 3/2020 | Finell et al. | |
| D877,568 S | 3/2020 | Finell et al. | |
| D877,569 S | 3/2020 | Finell et al. | |
| D878,157 S | 3/2020 | Finell et al. | |
| 10,610,449 B1 | 4/2020 | Reaux | |
| 10,625,906 B1 | 4/2020 | Nouri et al. | |
| D886,532 S | 6/2020 | Peng | |
| D886,533 S | 6/2020 | Finell et al. | |
| D886,534 S | 6/2020 | Finell et al. | |
| D887,786 S | 6/2020 | Finell et al. | |
| 10,710,789 B2 | 7/2020 | Schur et al. | |
| D894,691 S | 9/2020 | Nouri et al. | |
| 10,780,666 B2 | 9/2020 | Denis et al. | |
| D898,583 S | 10/2020 | Beardsall et al. | |
| 10,807,772 B2 | 10/2020 | Ruddell et al. | |
| D908,482 S | 1/2021 | Nouri et al. | |
| 11,084,628 B2 | 8/2021 | Finell et al. | |
| 11,098,940 B2 | 8/2021 | Finell | |
| 2002/0067865 A1 | 6/2002 | Stutzman | |
| 2002/0088825 A1 | 7/2002 | Laverdure | |
| 2002/0148852 A1 * | 10/2002 | Schultz | A61J 7/0023 |
| | | | 222/78 |
| 2002/0153468 A1 | 10/2002 | Folkmar | |
| 2003/0095727 A1 | 5/2003 | Leighton | |
| 2003/0142888 A1 | 7/2003 | Provost et al. | |
| 2003/0230595 A1 | 12/2003 | Piechocki et al. | |
| 2004/0042688 A1 | 3/2004 | Lee | |
| 2004/0208399 A1 | 10/2004 | Linneweil | |
| 2004/0217126 A1 | 11/2004 | Lee | |
| 2005/0111764 A1 | 5/2005 | Solder | |
| 2005/0178691 A1 | 8/2005 | Frenkil | |
| 2005/0241976 A1 | 11/2005 | Britto et al. | |
| 2005/0254733 A1 | 11/2005 | Ishizaki | |
| 2006/0037972 A1 * | 2/2006 | Leiner | A61C 5/62 |
| | | | 222/212 |
| 2006/0219595 A1 | 10/2006 | Peters | |
| 2006/0239594 A1 | 10/2006 | Ishizaki et al. | |
| 2007/0023298 A1 | 2/2007 | Mackenzie | |
| 2007/0110344 A1 | 5/2007 | Murray | |
| 2007/0175920 A1 | 8/2007 | Takada et al. | |
| 2007/0261215 A1 | 11/2007 | Leighton | |
| 2008/0006629 A1 | 1/2008 | Roth et al. | |
| 2008/0008406 A1 | 1/2008 | Russell et al. | |
| 2008/0029548 A1 * | 2/2008 | De Wree | A47K 5/122 |
| | | | 222/173 |

(56) References Cited

U.S. PATENT DOCUMENTS

| | | | |
|---|---|---|---|
| 2008/0061164 A1* | 3/2008 | Ciriani | B05B 7/10 |
| | | | 239/327 |
| 2008/0073348 A1 | 3/2008 | Pritikin et al. | |
| 2008/0105679 A1 | 5/2008 | Ballard | |
| 2008/0175520 A1 | 7/2008 | Simon | |
| 2008/0310774 A1 | 12/2008 | Turvey et al. | |
| 2009/0034885 A1 | 2/2009 | McGruder | |
| 2009/0110335 A1 | 4/2009 | LeBoeuf | |
| 2009/0142006 A1 | 6/2009 | Wine et al. | |
| 2009/0238495 A1 | 9/2009 | Anderson | |
| 2009/0297071 A1 | 12/2009 | Koenigkramer et al. | |
| 2010/0021090 A1 | 1/2010 | Wilske | |
| 2011/0038564 A1 | 2/2011 | Slansky | |
| 2011/0268373 A1 | 11/2011 | Polland | |
| 2012/0051670 A1 | 3/2012 | Matias | |
| 2012/0097710 A1* | 4/2012 | Ahmer | A61J 11/002 |
| | | | 222/215 |
| 2012/0195532 A1 | 8/2012 | Koesters | |
| 2012/0202667 A1 | 8/2012 | Greco et al. | |
| 2012/0285845 A1* | 11/2012 | Jackson | B65D 77/245 |
| | | | 206/223 |
| 2013/0105352 A1 | 5/2013 | Munguia | |
| 2013/0277392 A1 | 10/2013 | Dominguez | |
| 2014/0053945 A1 | 2/2014 | Albritton | |
| 2014/0193102 A1 | 7/2014 | Weir et al. | |
| 2014/0270579 A1 | 9/2014 | Nouri | |
| 2014/0363102 A1 | 12/2014 | Edwards et al. | |
| 2015/0173540 A1 | 6/2015 | Albers | |
| 2015/0203250 A1 | 7/2015 | Denis et al. | |
| 2015/0282653 A1 | 10/2015 | Lu et al. | |
| 2015/0284138 A1 | 10/2015 | Lane et al. | |
| 2016/0090213 A1 | 3/2016 | Murray | |
| 2016/0143467 A1 | 5/2016 | Matsch | |
| 2017/0006913 A1 | 1/2017 | Little et al. | |
| 2017/0088312 A1 | 3/2017 | Giglio | |
| 2017/0088318 A1 | 3/2017 | Franca et al. | |
| 2017/0121060 A1 | 5/2017 | Williamson et al. | |
| 2017/0217641 A1 | 8/2017 | Genaw, Jr. et al. | |
| 2017/0291740 A1 | 10/2017 | Genaw, Jr. et al. | |
| 2018/0148225 A1 | 5/2018 | Vandamme et al. | |
| 2018/0162622 A1 | 6/2018 | Barlev | |
| 2018/0251267 A1 | 9/2018 | Finell | |
| 2019/0002185 A1 | 1/2019 | Carroll | |
| 2019/0142144 A1* | 5/2019 | Rajan | C02F 1/003 |
| | | | 222/212 |
| 2019/0322432 A1 | 10/2019 | Burke | |
| 2020/0207520 A1 | 7/2020 | Nouri et al. | |
| 2020/0262632 A1 | 8/2020 | Ellis et al. | |
| 2021/0001585 A1 | 1/2021 | Denis et al. | |
| 2021/0323730 A1 | 10/2021 | Finell et al. | |
| 2021/0323731 A1 | 10/2021 | Finell et al. | |
| 2022/0218133 A1* | 7/2022 | Aldous | B65D 47/0842 |

FOREIGN PATENT DOCUMENTS

| | | |
|---|---|---|
| CA | 2159583 A1 | 10/1994 |
| CA | 2388017 A1 | 4/2001 |
| CA | 2526238 A1 | 12/2004 |
| CA | 2356674 C | 3/2008 |
| CA | 2728114 A1 | 1/2010 |
| CA | 2886078 C | 10/2019 |
| CN | 100396572 C | 6/2008 |
| CN | 100566619 C | 12/2009 |
| CN | 1972610 B | 8/2011 |
| CN | 102574610 B | 7/2014 |
| CN | 103732506 B | 9/2015 |
| CN | 104884359 A | 9/2015 |
| CN | 102947192 B | 11/2015 |
| CN | 106103294 A | 11/2016 |
| CN | 107428089 A | 12/2017 |
| CN | 107963340 A | 4/2018 |
| CN | 105836272 B | 6/2018 |
| CN | 108275359 A | 7/2018 |
| CN | 108438491 A | 8/2018 |
| CN | 108471847 A | 8/2018 |
| CN | 108945764 A | 12/2018 |
| CN | 109068818 A | 12/2018 |
| CN | 105377706 B | 1/2019 |
| CN | 109625571 A | 4/2019 |
| CN | 106573705 B | 5/2019 |
| CN | 109720716 A | 5/2019 |
| CN | 110406168 A | 11/2019 |
| CN | 110589204 A | 12/2019 |
| CN | 110804762 A | 3/2020 |
| CN | 111433131 A | 7/2020 |
| EP | 0537920 B1 | 2/1999 |
| GB | 525389 A | 8/1940 |
| WO | PCT/US22/11900 | 1/2022 |

OTHER PUBLICATIONS

U.S. Appl. No. 29/822,631, filed Jan. 11, 2022, Aldous et al.
U.S. Appl. No. 29/822,635, filed Jan. 11, 2022, Aldous et al.
U.S. Appl. No. 29/822,636, filed Jan. 11, 2022, Aldous et al.
U.S. Appl. No. 29/822,637, filed Jan. 11, 2022, Aldous et al.
U.S. Appl. No. 29/822,638, filed Jan. 11, 2022, Aldous et al.
U.S. Appl. No. 29/822,639, filed Jan. 11, 2022, Aldous et al.

* cited by examiner

SILICONE FOOD AND BEVERAGE STORAGE CONTAINERS

RELATED APPLICATIONS

This application claims the benefit of U.S. Provisional Application No. 63/136,365, filed on Jan. 12, 2021, U.S. Provisional Application No. 63/154,316, filed on Feb. 26, 2021, and U.S. Provisional Application No. 63/235,550, filed on Aug. 20, 2021, the entireties of which are herein incorporated by reference.

TECHNICAL FIELD

The present disclosure relates to food and beverage storage containers, and in particular, to a silicone storage container having an inner insert.

BACKGROUND

Existing reusable food and beverage storage containers suffer from a number of drawbacks. For example, they may be difficult to open and close, clean, dry, stand up upright, fill, and/or seal. Such containers may also tear or break, rendering them unusable. Additionally, food and beverage storage containers may face issues of leakage from poor sealing, which impact the user experiences.

It is an object of the present disclosure to provide reusable food and beverage containers that can be scaled across a broad range of usage occasions and sizes, including from infant to adult hydration or feeding. Solely by way of example, the containers of the present disclosure may be used for baby food, purees, soups, smoothies, yogurt, salad dressings, beverages of any type, fruits, and snacks, whether hot or cold. Additionally, because containers of the present disclosure form enclosures with spouts and/or easy to access contents, they are ideal for "on the go" activities, where use of an open food or beverage container may otherwise lead to spilling.

SUMMARY

In one aspect, a storage container includes an elastomeric base, an inner insert, an outer cap, and a screw cap. The elastomeric base has a plurality of side walls forming an interior and an opening at an upper edge of the base. The base includes an annular channel positioned proximate the opening at the upper edge of the base. The inner insert is removably positionable in the opening of the base, and includes an outward facing annular protrusion configured for insertion in the annular channel of the base. The inner insert includes a spout with a channel formed therethrough. At least a portion of the spout has external threading. The outer cap is positionable over the inner insert, and the cap includes an opening for receiving the spout. The screw cap includes internal threading configured for rotational engagement with the external threading of the spout. Rotation of screw cap compresses at least a portion of the base between the inner insert and the outer cap.

In another aspect, the base may further include an inward facing annular protrusion configured to engage a lower surface of the inner insert. The base may further include an inward facing annular protrusion proximate the opening. The inward facing annual protrusion may be proximate the opening and received between and in contact with the inner insert and the outer cap.

In another aspect, the inner insert may include an annular channel configured to receive an annular shoulder extending downward from the inward facing annular protrusion proximate the opening.

In another aspect, the outer cap may include a downward facing annular skit configured to compress at least a portion of the base.

In another aspect, the storage container may further include an inward facing annular protrusion proximate the opening and include an annular step extending upward from the inward facing annular protrusion proximate the opening. The annular step may be positioned between the downward facing annular skirt and the inner insert.

In another aspect, the outer cap may include a downward facing outer skirt configured to compress at least a portion of the base between the outer skirt and the inner insert.

In another aspect, the storage container may further include a spout cap removably attachable to the spout. The spout cap may be connected via an arm to a ring surrounding the spout.

In another aspect, the storage container may further include a spoon bowl extending from the spot cap. The spoon bowl may be in fluid communication with an interior of the spout cap via a channel extending therethrough.

In another aspect, the storage container may include a bi-directional valve positioned in the spout.

In another aspect, the storage container may include any one or more of the features listed above.

In yet another aspect, a storage container system includes an elastomeric base. The elastomeric base has a plurality of side walls forming an interior and an opening at an upper edge of the base. The base includes an inward facing annular protrusion proximate the opening, an annular channel, and a second inward facing annular protrusion. The annular channel is positioned proximate the opening at the upper edge of the base. The annular channel is configured to receive an outward facing annular protrusion on an inner insert removably positionable in the opening of the base. The second inward facing annular protrusion is configured to engage a lower surface of the inner insert.

In another aspect, the base may further include an annular shoulder extending downward from the inward facing annular protrusion proximate the opening. The base may further include an annular step extending upward from the inward facing annular protrusion proximate the opening.

In another aspect, the storage container system may further include the inner insert. The inner insert may be positionable in the opening of the base to expand the opening and create a compression fit within the base.

In another aspect, the inner insert may be associated with at least one popsicle stick.

In another aspect, the inner insert may include a removable lid or cover moveable relative to the inner insert for access to the interior of the base.

In another aspect, the storage container system may further include the inner insert. The inner insert may comprise a spout with a channel formed therethrough.

In another aspect, the storage container system may further include a screw cap having internal threading. The internal threading may be configured for rotational engagement with external threading on the spout. Rotation of screw cap may compress at least a portion of the base between the inner insert and the outer cap.

In another aspect, the storage container system may further include a spout cap removably connectable to the spout, the spout cap being associated with an arm and a ring for surrounding the spout.

In another aspect, the storage container system may further include a spout cap removably connectable to the spout. The spout cap may have a spoon bowl extending therefrom. The spoon bowl may be in fluid communication with an interior of the spout cap via a channel extending therethrough.

In another aspect, the storage container system may include any one or more of the features listed above.

In yet another aspect, a storage container includes a base, an inner insert, and an outer cap. The base has a plurality of side walls forming an interior and an opening at an upper edge of the base. The inner insert is positioned in the opening and sized and shaped to contact the plurality of side walls, the inner insert including a spout with a channel formed therethrough. The outer cap is positioned over the inner insert, and the outer cap has an opening, with the spout extending through the opening. At least a portion of the plurality of side walls are compressed between the inner insert and the outer cap to create a seal.

In another aspect, the base may include an elastomer.

In another aspect, the elastomer may be silicone.

In another aspect, the storage container may further include a second cap. The second cap may be configured to surround the spout and compress the outer cap toward the inner insert.

In another aspect, the storage container may further include a screw cap. The screw cap may be configured to screw onto the spout and compress the outer cap toward the inner insert.

In another aspect, a portion of the spout may include one of a male threading or a female threading. An inner channel of the screw cap may include the other of the male threading or the female threading.

In another aspect, at least an end portion of the spout may be without threading.

In another aspect, base may include at least one annual protrusion proximate the opening extending radially inward to engage a surface of the inner insert.

In another aspect, the at least one annular protrusion may be integrally formed with the base.

In another aspect, the inner insert may include at least one annual protrusion extending radially outward to engage a surface of the base proximate the opening.

In another aspect, the inner insert may be compression fit in the opening of the base.

In another aspect, wherein the base may further include an annular lip extending radially inward at the opening, the annular lip contacting a surface of the inner insert.

In another aspect, the storage container may further include an annual shoulder extending from the annular lip toward the interior of the base.

In another aspect, the inner insert may include an annular channel configured to receive the annual shoulder.

In another aspect, wherein the inner insert is removably attached to the base.

In another aspect, the storage container may include a spout cap removably attached to an end of the spout.

In another aspect, the storage container may include a spout cap removably attached to an end of the spout. The spout cap may include a ring surrounding the spout, the ring being positioned between the outer cap and the cap.

In another aspect, the base may be configured to stand upright on a flat surface.

In another aspect, the inner insert and the outer cap may include a rigid material.

In another aspect, the base may include an annular lip extending radially inward at the opening, and the annular lip may include an annular first rib projecting upward.

In another aspect, an inner skirt of the outer cap may be configured to be engaged with the lip, and a sidewall of the inner skirt may be engaged with a side wall of the first rib.

In another aspect, the lip may include a channel configured to receive the inner skirt of the outer cap.

In another aspect, the lip may include a second rib configured to sandwich the inner skirt of the outer cap with the first rib.

In another aspect, the inner insert may include an annular protrusion and the base may form an annular channel therein to receive the annular protrusion of the inner insert.

In another aspect, an inner skirt of the outer cap and the annular protrusion of the inner insert may sandwich the lip of the base.

In another aspect, the outer cap may include an outer skirt, which may compress the side walls of the base.

In another aspect, the storage container may comprise a screw cap configured to screw onto the spout and compress the outer cap toward the inner insert.

In another aspect, the screw cap may include a fastener inserted between the inner insert and the outer cap to affix the screw cap to the outer cap.

In another aspect, the fastener may include a hook to engage a periphery of the opening of the outer cap.

In another aspect, the screw cap may form a neck on which to mount an attachment.

In another aspect, the attachment may include a ring configured to mount to the neck.

In another aspect, the attachment may include a first spout cap and a first arm, and the first spout cap may be connected to the ring with the first arm.

In another aspect, the first spout cap may include a spoon bowl, and the first spout cap defines a channel between the spoon bowl and the spout.

In another aspect, the attachment may further include a second spout cap opposite to the first spout cap, and the second spout cap may be configured to seal the channel of the spout.

In another aspect, the screw cap may include a spout outlet connected to the spout of the inner insert.

In another aspect, the storage container may comprise a valve sized and shaped to fit into the spout of the inner insert.

In another aspect, the spout of the inner insert may include a lip to house the valve.

In another aspect, the lip of the inner insert may include one or more channels situated on the lip of the inner insert and the valve may include one annular lip covering the one or more channel.

In another aspect, the annular lip may be deformed when suction is applied on the spout.

In another aspect, the valve further may include a plurality of leaflets positioned at a side of the lip opposite to the annular lip.

In another aspect, the storage container may comprise a screw cap, and the screw cap may be configured to screw onto the spout. The spout may have a curvature to a seamless connection with a top surface of the screw cap.

In another aspect, the storage container may comprise a screw cap, and the screw cap may be configured to screw onto the spout. The screw cap may include a spoon bowl positioned adjacent to the channel and configured to receive stored content exiting the channel.

In another aspect, the spout may include a spoon bowl positioned at an end of the spout and configured to receive stored content exiting the channel.

In another aspect, the base may have a rigidity less than a rigidity of the inner insert.

In another aspect, the opening of the base may be deformed and/or stretched to fit the inner insert.

In another aspect, the opening of the base may have a first width larger than a first width of the inner insert in a first direction. The opening of the base may have a second width smaller than a second width of the inner insert in a second direction perpendicular to the first direction, before the inner insert is inserted into the base.

In another aspect, the first width of the base may reduce and the second width of the base may increase after the inner insert is assembled with the base.

In another aspect, the opening of the base may have a first width smaller than a first width of the inner insert in a first direction, and the opening of the base may have a second width smaller than a second width of the inner insert in a second direction perpendicular to the first direction, before the inner insert is inserted into the base.

In another aspect, the storage container may include any one or more of the features listed above.

In still another aspect, a storage container includes a base and an inner insert. The base has a plurality of side walls forming an interior and an opening at an upper edge of the base. The inner insert is positioned in the opening and sized and shaped to contact the plurality of side walls. The inner insert has an annular protrusion to engage with the base. The base further includes an annular channel configured to receive the annular protrusion of the inner insert.

In another aspect, the inner insert may form an opening for housing a stick and the stick may be positioned partially in the base and partially out of the base.

In another aspect, the stick may include an intermediate portion having a width larger than adjacent portions, and the intermediate portion may be configured to engage with a periphery of the opening of the inner insert to seal the opening of the inner insert.

In another aspect, the stick may further include a sealing ring positioned between the intermediate portion and the periphery of the opening of the inner insert.

In another aspect, the intermediate portion may be thicker than the inner insert adjacent to the intermediate portion.

In another aspect, the inner insert may include an annular channel configured to receive an annular lip of the base.

In another aspect, the storage container may further include an outer cap positioned over the inner insert.

In another aspect, the inner insert may include at least one ear extending outwards from the inner insert.

In another aspect, the at least one ear may include a fastener configured to affix the outer cap on the inner insert.

In another aspect, the fastener may include a button configured to engage a button hole of the outer cap. The outer cap may be configured to cover the opening of the inner insert.

In another aspect, the base may include at least one annular protrusion proximate the opening extending radially inward to engage a surface of the inner insert.

In another aspect, the at least one annular protrusion may be integrally formed with the base.

In another aspect, the inner insert may include a rigid material.

In another aspect, the base may include an elastomer.

In another aspect, the elastomer may be silicone.

In another aspect, the base may have a rigidity less than a rigidity of the inner insert.

In another aspect, the opening of the base may be deformed and/or stretched to fit the inner insert.

In another aspect, the opening of the base may have a first width larger than a first width of the inner insert in a first direction and the opening of the base may have a second width smaller than a second width of the inner insert in a second direction perpendicular to the first direction before the inner insert is positioned into the base.

In another aspect, the first width of the base may reduce and the second width of the base may increase after the inner insert is assembled with the base.

In another aspect, the opening of the base may have a first width smaller than a first width of the inner insert in a first direction, and the opening of the base may have a second width smaller than a second width of the inner insert in a second direction perpendicular to the first direction, before the inner insert is inserted into the base.

In another aspect, the attachment may include a first ring and a second ring coupled to the first ring and the spout cap. The first ring may be positionable about the neck, and the second ring may be compressed between the spout and the screw cap.

In another aspect, the attachment may include a bridge connected between the first ring and the second ring and the bottom of the spout cap includes a gap. The bridge may be received by the gap.

In another aspect, the storage container may comprise a barrier sized and shaped to fit into the spout of the inner insert.

In another aspect, the storage container may include any one or more of the features listed above.

In still another aspect, a storage container includes a base and a first inner insert. The base has a plurality of side walls forming an interior and an opening at an upper edge of the base. The base has an annular protrusion extending radially inward proximate the opening. The first inner insert is positionable in the opening. The inner insert has a cover configured to engage with the annular protrusion of the base and a stick coupled to the cover. The storage container may further include a second inner insert configured to divide the base into at least two volumes, and a third inner insert having a cover and a stick. The cover of the first inner insert and the cover of the third inner insert may be sized and shaped to mate with the annular protrusion of the base, and the sticks of the first and third inner inserts are positionable in the volumes. The first, second, and the third inner inserts are removably positionable in the base.

In another aspect, the second inner insert may include first and second ledges opposite to each other and configured to contact the covers of the first and third inner inserts, when the first, second, and third inner inserts are positioned in the base.

In another aspect, the second inner insert may include third and fourth ledges positionable below the annular protrusion of the base, when the second inner insert is positioned in the base.

In another aspect, the second inner insert may include a ridge positioned between the covers of the first and the third inner inserts, and the base forms a compression fit with an assembly of the covers of the first and third inner inserts and the ridge of the second inner insert, when the first, second, and third inner inserts are positioned in the base.

In another aspect, the second inner insert may include a first and second sidewalls opposite to each other and facing the first and third inner inserts, when the first, second, and third inner inserts are positioned in the base. The first and second sidewalls may be curved inwardly.

In another aspect, the second inner insert may include a third and fourth sidewalls opposite to each other and located between the first and the second sidewalls, when the first, second, and third inner inserts are positioned in the base. The third and fourth sidewalls may be curved outwardly.

In another aspect, the storage container may include any one or more of the features listed above.

BRIEF DESCRIPTION OF THE DRAWINGS

The embodiments can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

FIGS. 13A-B are perspective views of an alternative base for use with the storage container of FIG. 2A, while

DESCRIPTION

Figure 1A:
FIGS. 1A-B show one embodiment of a storage container according to the present disclosure.
Figure 1B:

FIGS. 1A-B show one embodiment of a silicone storage container 100 according to the present disclosure. Although the silicone storage container 100 may be scaled across a broad range of usage occasions and sizes, as illustrated, it is particularly suited for use as a food or beverage container, including for example, by infants.

Figure 2A:
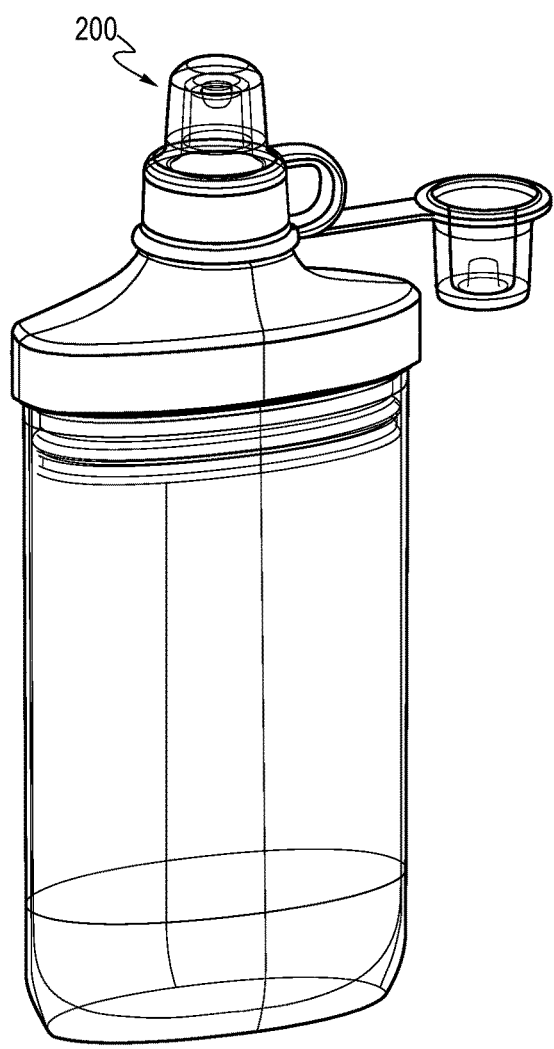
FIGS. 2A-B show another embodiment of a storage container according to the present disclosure, including an exploded view of the storage container's components.
Figure 2B:
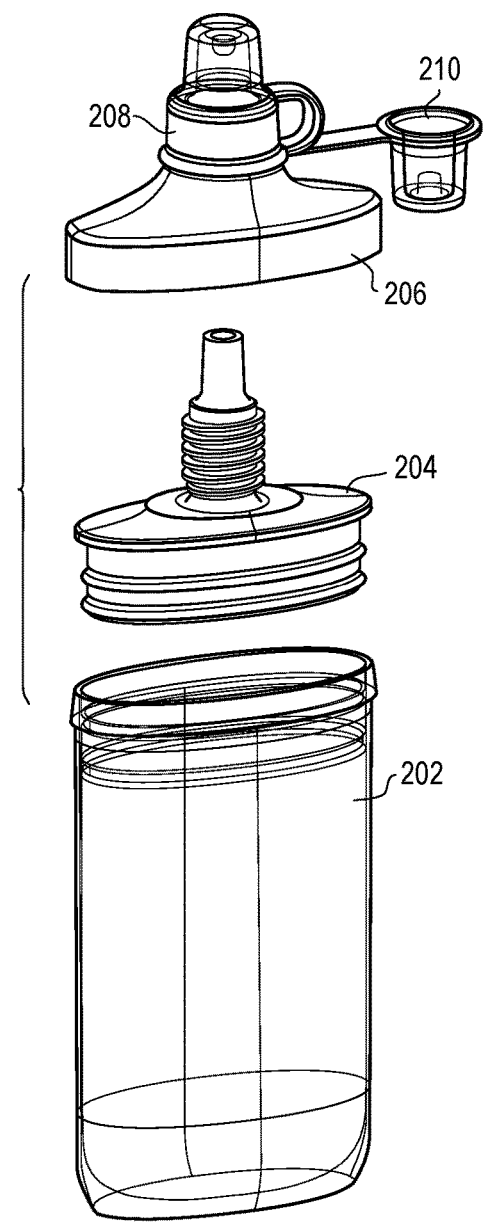

FIGS. 2A-B show a second embodiment of a silicone storage container 200 according to the present disclosure. In general, the storage container includes a base 202, an inner insert 204, an outer base cap 206, a screw cap 208, and a spout cap 210. In some embodiments, the base 202 and the spout cap 210 are formed of an elastomeric material, such as silicone, while the inner insert 204, the outer base cap 206, and the screw cap 208 are formed of a rigid plastic, such as polypropylene. Preferably, the base 202, the inner insert 204, the outer base cap 206, the screw cap 208, and the spout cap 210 are all separable for purposes of washing and/or cleaning each component, whether by hand or in a dishwasher. It should be appreciated that each component may be sized according to the intended user (e.g., infant or adult) and/or contents to be stored (e.g., a relatively small volume for salad dressings vs. a relatively large volume for beverages).

Figure 3:
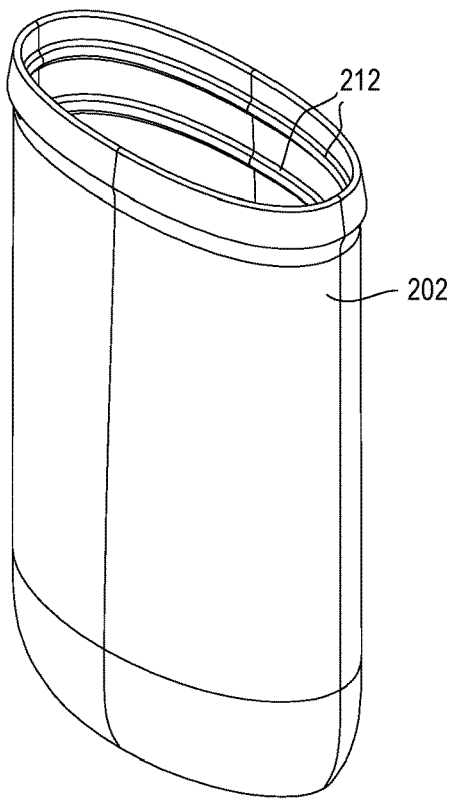
FIG. 3 is a front perspective view of a base of the storage container of FIG. 2A.
Figure 4:
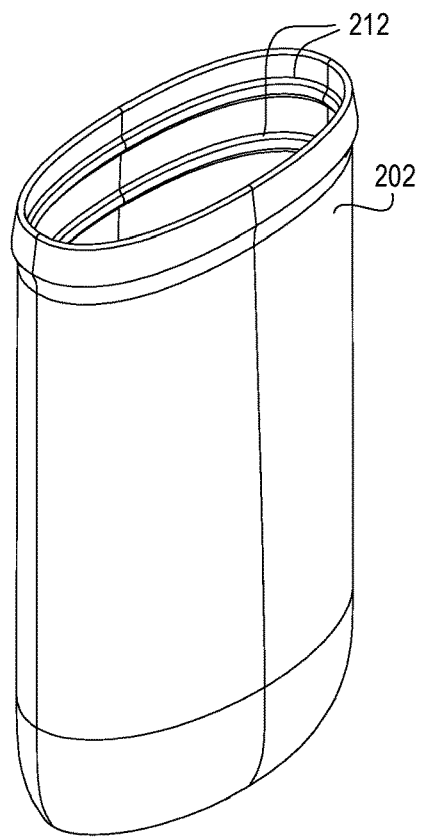
FIG. 4 is a rear perspective view of the base of the storage container of FIG. 2A.
Figure 5:
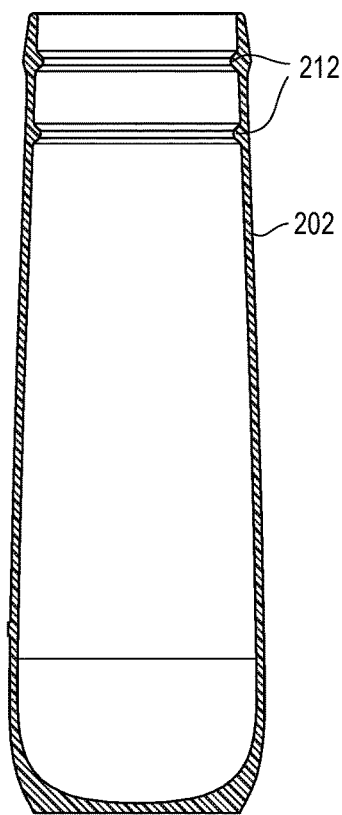
FIG. 5 is a cross-sectional view of the base of the storage container of FIG. 2A.

FIGS. 3-5 illustrate the base 202. Although the base 202 is illustrated as having a generally elliptical shape, in other embodiments the base 202 may have any number of shapes, including generally circular, generally square, or generally rectangular. Additionally, the base 202 may have a profile that narrows from the bottom of the base 202 to the top of the base 202. In some embodiments, the base 202 is configured to stand upright, for example, when placed on a flat surface.

As illustrated in FIGS. 3-5, the base 202 may have one or more annular protrusions 212 positioned proximate the opening of the base 202 and extending radially inward. The protrusions 212 may be integrally molded with the base 202, or may be separately bonded to the base 202. Although the base 202 is illustrated as having two annular protrusions 212, in some embodiments, the base 202 may have three or more annular protrusions 212.

Figure 6:
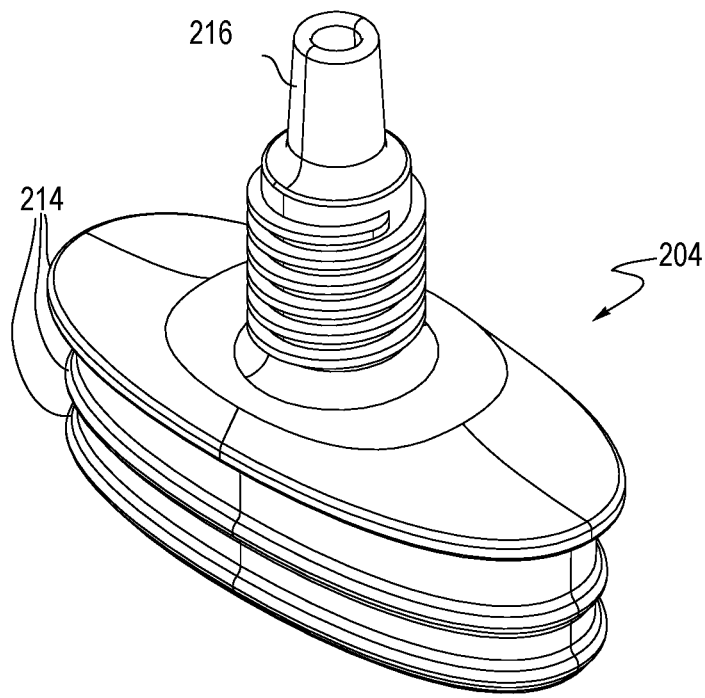
FIG. 6 is a perspective view of an inner insert of the storage container of FIG. 2A.
Figure 7:
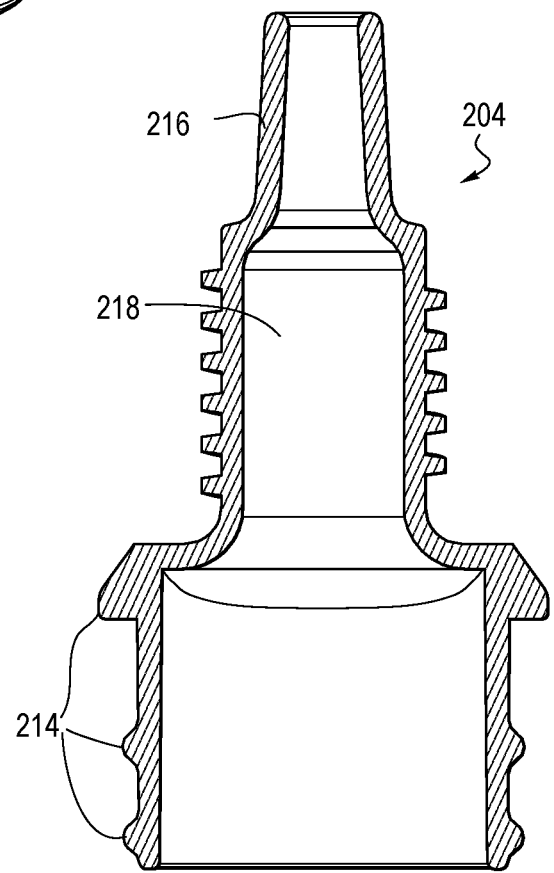
FIG. 7 is a cross-sectional view of the inner insert of FIG. 6.

FIGS. 6-7 illustrate the inner insert 204. In general, the inner insert 204 is sized and shaped to fit tightly within the opening of the base 202. In some embodiments, the inner insert 204 is compression fit within the base 202, particularly when base 202 is formed of an elastomeric material, such as silicone. In addition, the base 202 includes one or more annular protrusions 214 extending radially outward. The annular protrusions 214 extending radially outward may engage the inner surface of the base 202 to form a compression fit, for example, in the spaces formed between the annular protrusions 212 extending radially inward of the base 202. In some embodiments, at least one annular protrusion 214 may extend over the top edge of the opening to base 202. Although the inner insert 204 is illustrated as having three annular protrusions 214, in some embodiments, the inner insert 204 may have four or more annular protrusions 214.

The inner insert 204 further includes a spout 216 having an inner channel 218 formed therethrough for transfer of food or a beverage from within the base 202. As illustrated, at least a portion of the spout 216 includes male threading for engagement with female threading on the screw cap 208, while at least a separate portion of the spout is without threading, which for example, may be placed in the mouth of a user. In some embodiments, the spout 216 could include female threading for engagement with male threading on the screw cap 208. In other embodiments, the inner insert 204 may engage the screw cap 208 to form a click or snap tight fit, in addition to or as an alternative to threading.

Figure 8:
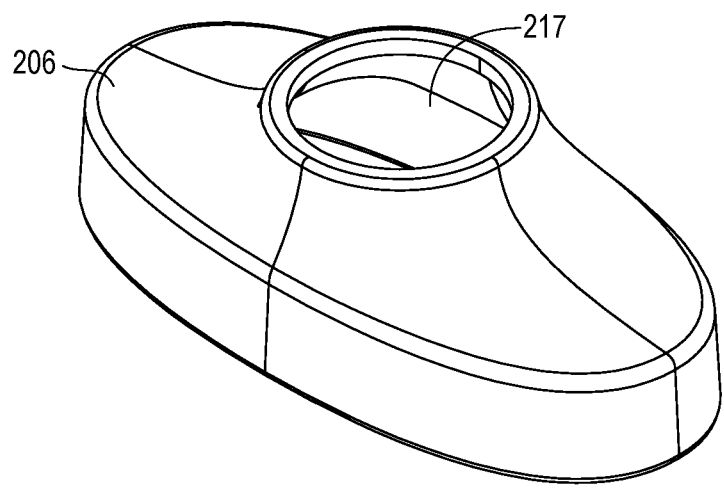
FIG. 8 is a perspective view of an outer base cap of the storage container of FIG. 2A.
Figure 9:
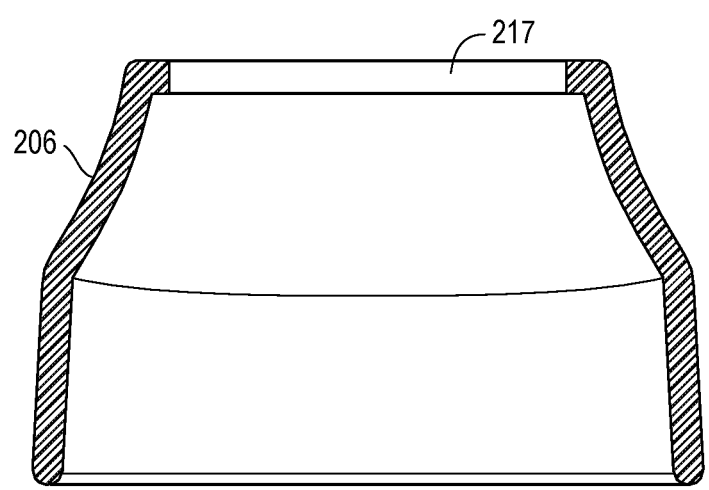
FIG. 9 is a cross-sectional view of the outer base cap of FIG. 8.

FIGS. 8-9 illustrate the outer base cap 206. In general, the outer base cap 206 is sized and shaped to fit tightly over the inner insert 204 and at least a portion of the base 202. For example, the outer base cap 206 may fit tightly over the region of the base 202 where the one or more annular protrusions 214 extend radially outward from the inner insert 204 to engage the inner surface of the base 202. In this way, the outer base cap 206 may strengthen and/or establish the compression fit between the inner insert 204 and the base 202, thereby forming a seal. The outer base cap 206 further includes an opening 217 sized to receive the spout 216 therethrough.

Figure 10:
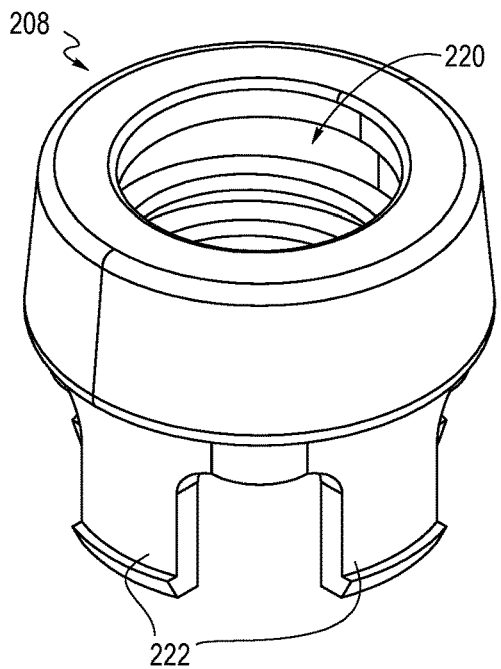
FIG. 10 is a screw cap of the storage container of FIG. 2A.
Figure 11:
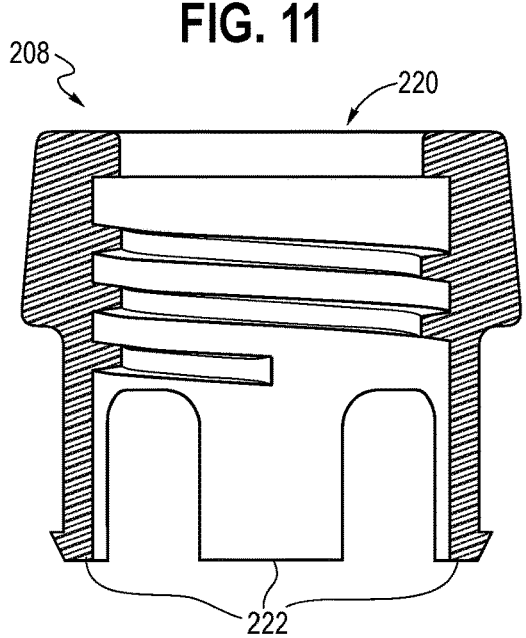
FIG. 11 is a cross-sectional view of the screw cap of FIG. 10.

FIGS. 10-11 illustrate the screw cap 208. In general, the screw cap 208 is configured to fit over the spout 216 of the inner insert 204 and fix the outer base cap 206 to the inner insert 204 via a threaded engagement between the screw cap 208 and the spout 216. In that regard, the screw cap 208 includes an inner channel 220 for receiving the spout 216. As illustrated, at least a portion of the inner channel 220 includes female threading for engagement with the male threading on the spout 216. In some embodiments, the inner channel 220 could include male threading for engagement with female threading on the spout 216. In other embodiments, the screw cap 208 may engage the inner insert 204 to form a click or snap tight fit, in addition to or as an alternative to threading.

The screw cap 208 may optionally include one or more extensions 222 projecting downward toward the outer base cap 206 when the screw cap 208 is threaded onto the spout 216, such that the screw cap 208 and/or the extensions 222 compress the outer base cap 206 between the inner insert 204 and the screw cap 208, further securing the inner insert 204 and the outer base cap 206 to the base 202.

Figure 12:
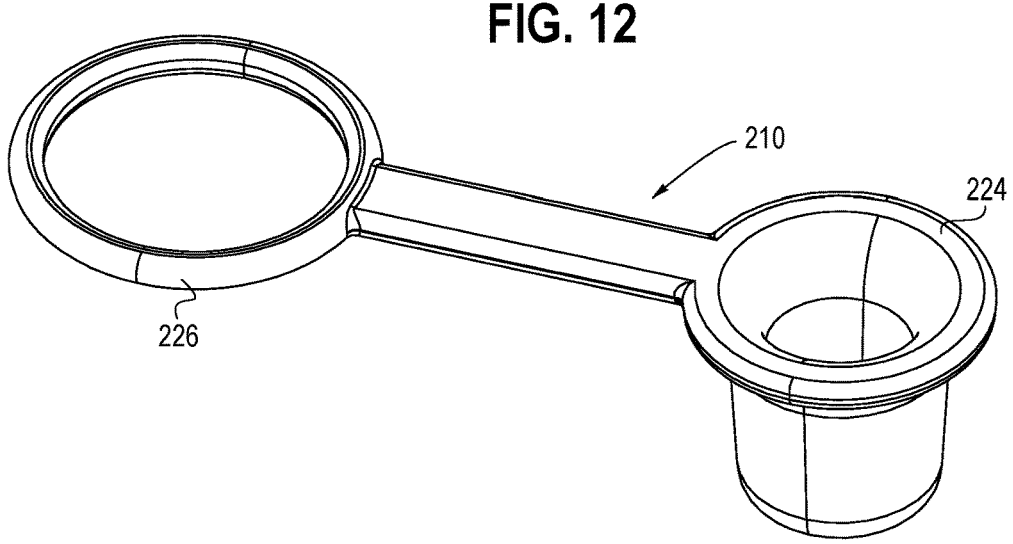
FIG. 12 is a perspective view of a spout cap of the storage container of FIG. 2A.

FIG. 12 illustrates the spout cap 210. In general, the spout cap 210 includes a cap portion 224 that fits over the spout 216 to selectively open and close the spout 216 and permit or prevent the passage of food or drink therethrough. The spout cap 210 further includes a ring 226 for securing the spout cap 210 to the spout 216. The ring 226 may be placed around the spout 216 prior to threading the screw cap 208 onto the spout 216, such that the spout cap 210 becomes fixed to the spout 216.

To use the silicone storage container 200, a user may first fill the base 202 with food or a beverage. Next, the user may fit the inner insert 204 into the opening of the base 202, thereby enclosing base 202 to contain the food or beverage stored therein. With the inner insert 204 connected to the base 202, the user may then slide the outer base cap 206 over the spout 216 of the inner insert 204, followed by the ring 226 of the spout cap 210. Next, the user may thread the screw cap 208 onto the spout 2016, thereby fixing the base 202, the inner insert 204, the outer base cap 206, the screw cap 208, and the spout cap 210 to one another. Then, the cap portion 224 may be selectively opened and closed to permit or prevent the passage of food or drink through the spout 216. The user may pass food or drink through the spout 216 when the cap portion 224 is removed, for example, by using the spout 216 like a drinking straw, squeezing the base 202, and/or turning the storage container 200 upside down. After using the storage container 200, the user may disassemble its components for washing and/or cleaning, whether by hand or in a dishwasher.

Figure 13A:
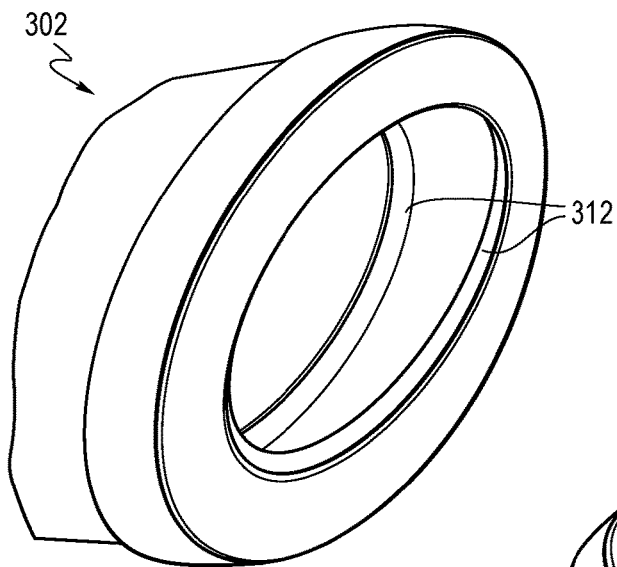
Figure 13B:
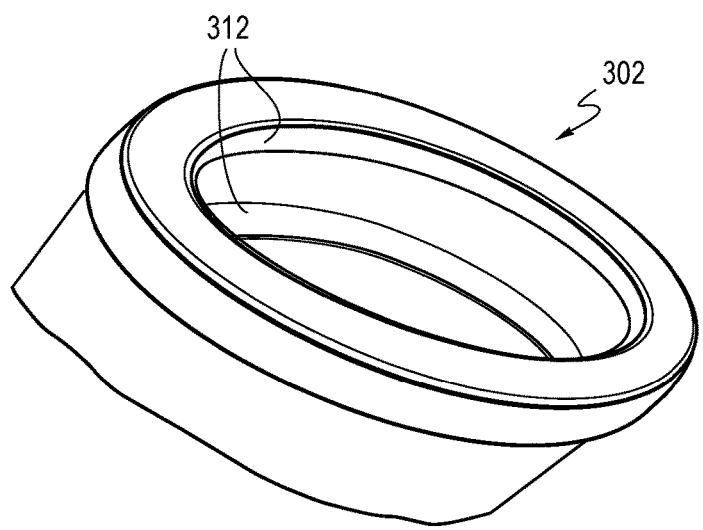
Figure 13C:
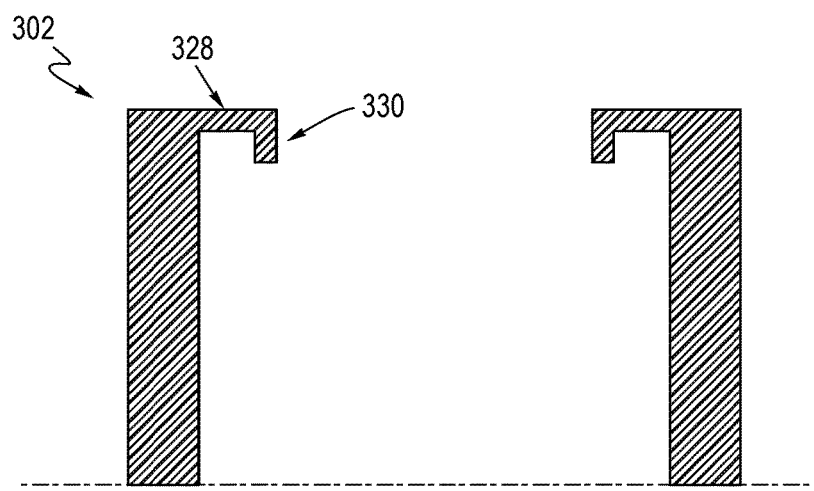
FIG. 13C is an illustration of a cross-sectional view of the alternative base of FIGS. 13A-B.
Figure 14:
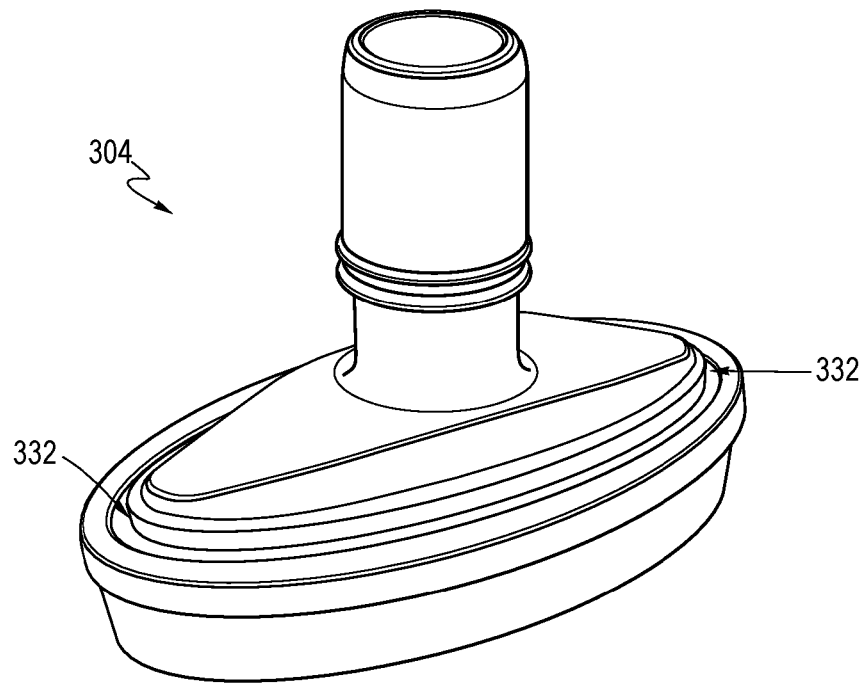
FIG. 14 is a perspective view of an alternative inner insert for use with the storage container of FIG. 2A.
Figure 15A:
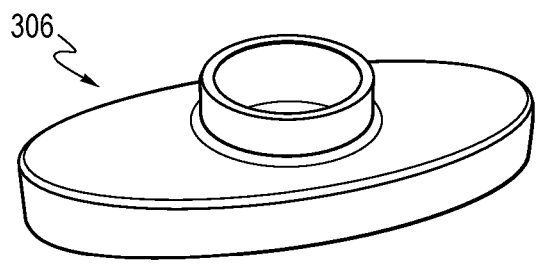
FIGS. 15A-B are perspective views of an alternative outer base cap for use with the storage container of FIG. 2A.
Figure 15B:
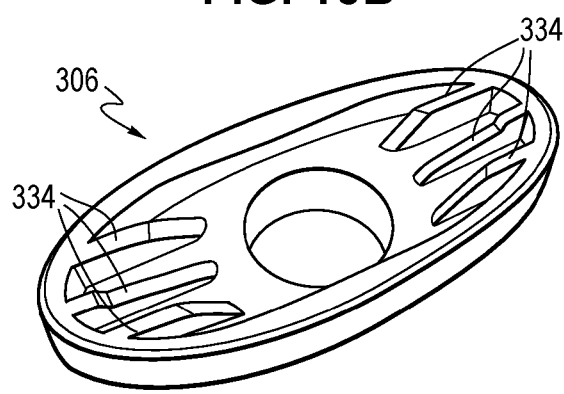

FIGS. 13A-B are perspective views of an alternative base 302, while FIG. 13C is an illustration of a cross-sectional view of the base 302. FIG. 14 is a perspective view of an alternative inner insert 304. FIGS. 15A-B are perspective views of an alternative outer base cap 306. Except as described below, the base 302, inner insert 304, and outer base cap 306 may be used in the storage container 200 in the same manner as described above with regard to the base 202, the inner insert 204, and the outer base cap 206.

The base 302 of FIGS. 13A-C differs from the base 202 of FIGS. 3-5 in that it also includes an inwardly projecting lip 328 configured to fit over an upper surface of the inner insert 304. Additionally, the inwardly projecting lip 328 has a downward projecting shoulder 330 configured to fit tightly within a corresponding annular channel 332 formed in the upper surface of the inner insert 304. Like the base 202, the base 302 may include one or more annular protrusion 312 positioned proximate the opening of the base 302 and extending radially inward to engage the inner insert 304.

The inner insert 304 of FIG. 14 differs from the inner insert 204 of FIGS. 6-7 primarily in that it includes an annular channel 332 formed in an upper surface of the inner insert 304. The annular channel 332 is sized and shaped to receive the shoulder 330 of the base 302 when the inner insert 304 is inserted into the opening of the base 302. Like the inner insert 204, the inner insert 304 may have one or more annular protrusions that extend radially outward to engage the inner surface of the base 302. However, as illustrated in the embodiment of FIG. 14, the inner insert 304 may optionally exclude the one or more annular protrusions 314.

The outer base cap 306 of FIGS. 15A-B differs from the outer base cap 206 of FIGS. 8-9 primarily in that the underside of the outer base cap 306 includes a plurality of ridges 334 configured to engage the inwardly projecting lip 328 of the base 302 when the outer base cap 306 is placed on the inner insert 304.

In use, when the base 302, the inner insert 304, the outer base cap 306, and a screw cap (for example, screw cap 208) are assembled as explained above in relation to the storage container 200, the screw cap is threaded onto the spout of the inner insert 304, such that the screw cap compresses the outer base cap 306 against the lip 328 and/or the inner insert 304, pushing the shoulder 330 into the annular channel 332, thereby forming a seal and preventing food or beverage in the base 302 from leaking.

Figure 16A:
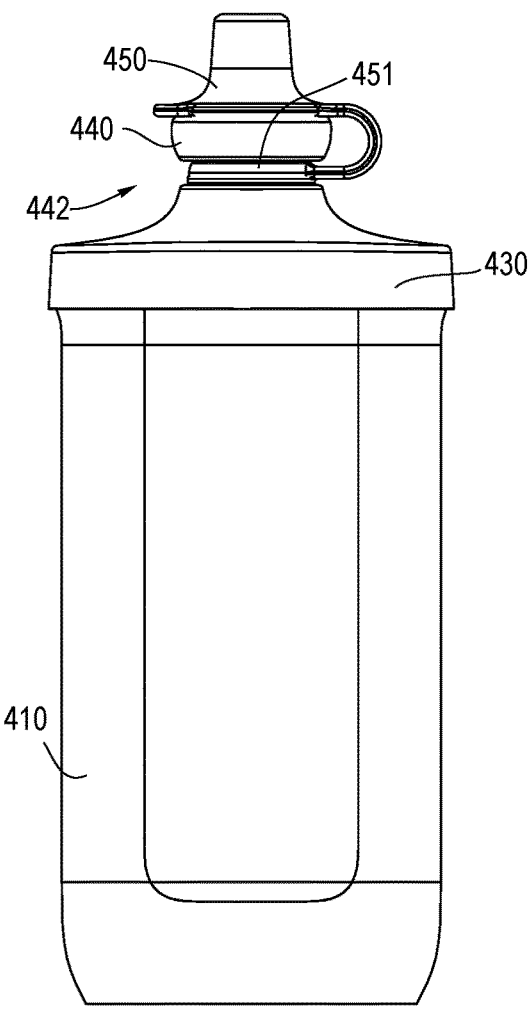
FIGS. 16A-B are a side view and a perspective view of another embodiment of a storage container of this disclosure.
Figure 16B:
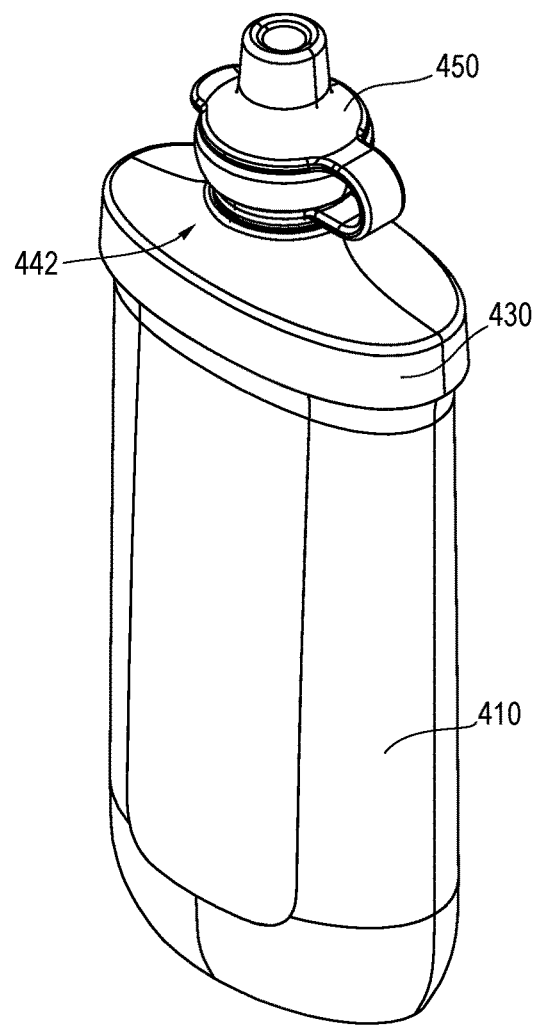
Figure 16C:
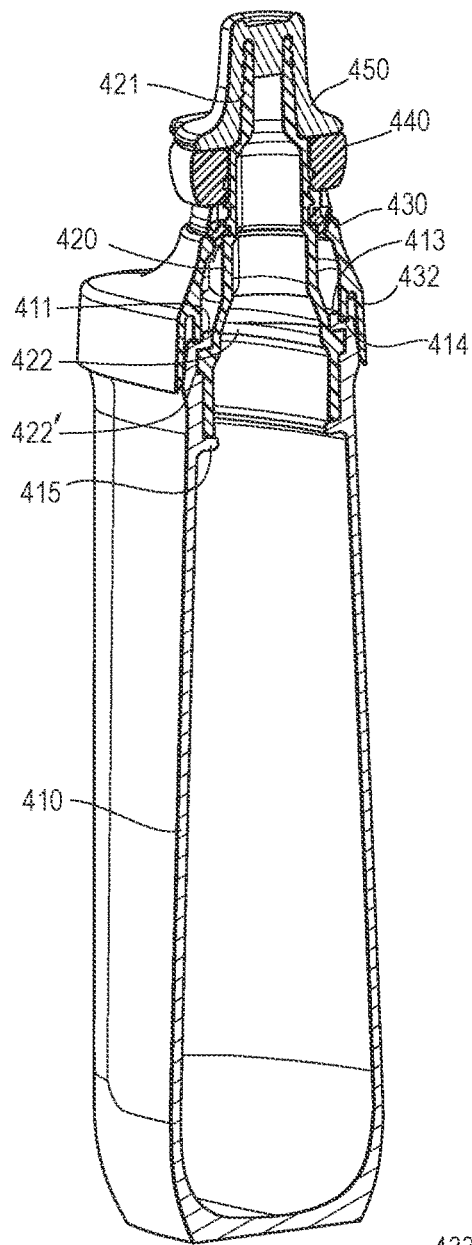
FIG. 16C is a cross-sectional view of the storage container of FIG. 16A.

FIGS. 16A-D show another embodiment of a storage container of this disclosure. The storage container as shown in FIGS. 16A-D can be used as, for example, a food pouch for fluids or liquid foods. FIG. 17 shows another embodiment of a storage container of this disclosure, which has the similar structure as the container of FIG. 16A, but a larger capacity. FIGS. 18A-H show another embodiment of a storage container of this disclosure. The storage container as shown in FIGS. 18A to 18H can be used as, but not limited to, a smoothie cup. FIGS. 19A-D show another embodiment of a storage container of this disclosure, which can be used, but not limited to, as a sippy cup. The common structures and configurations of these embodiments are described below, with additional explanation directed to the main differences between these embodiments.

The storage containers have a base 410, an inner insert 420, and an outer base cap 430. The interconnection of those components is similar to the base 202, the inner insert 204, and the outer base cap 206, as described above for other embodiments. Specifically, the base 410 has a plurality of side walls forming an interior and an opening at an upper edge of the base 410. The inner insert 420 is positioned in the opening of the base and sized and shaped to contact the plurality of side walls. The inner insert 420 includes a spout 421 with a channel formed therethrough. The outer base cap 430 is positioned over the inner insert 420, and the outer base cap 430 has an opening, where the spout 421 extends through the opening. In an implementation, the base 410 may be made of or comprise an elastomer, such silicone. Further, the inner insert can be made of or comprise a rigid material.

Further, the base 410 includes an annular inward-facing lip 417. The annular lip 417 contacts the inner insert 420. A periphery of the opening of the base 410 forms an upward-facing rib 411 formed on the lip 417, such as at the edge of the lip 417. The rib 411 may be annular. The rib 411 includes a higher surface 413, and the adjacent surface of the lip 417 includes a lower surface 414. The outer base cap 430 includes a downward-facing inner skirt 433, which may be annular and may surround the rib 411. The inner skirt 433 of the outer base cap 430 is engaged with the lower surface 414. The lower surface 414 may include channel to receive the inner skirt 433 of the outer base cap 430, for example, as shown in FIG. 18G.

Figure 16D:
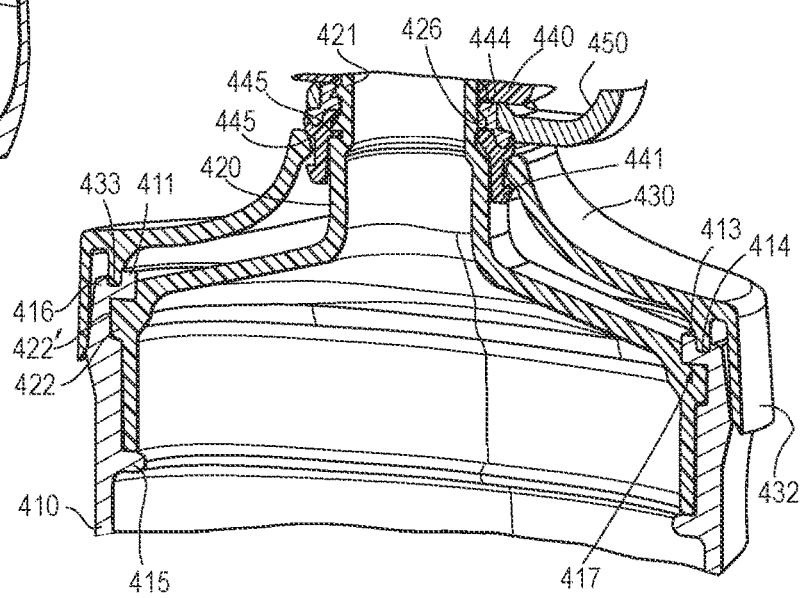
FIG. 16D is an enlarged cross-sectional view of the storage container of FIG. 16A.
Figure 17:
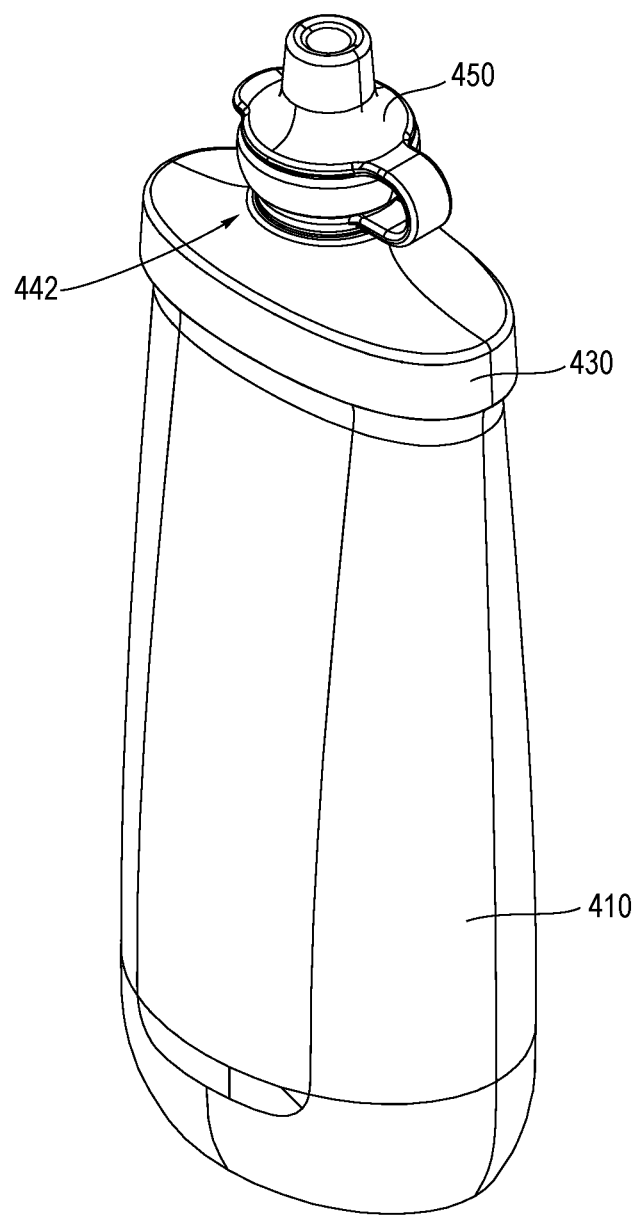
FIG. 17 is a perspective view of another embodiment of a storage container of this disclosure.
Figure 18A:
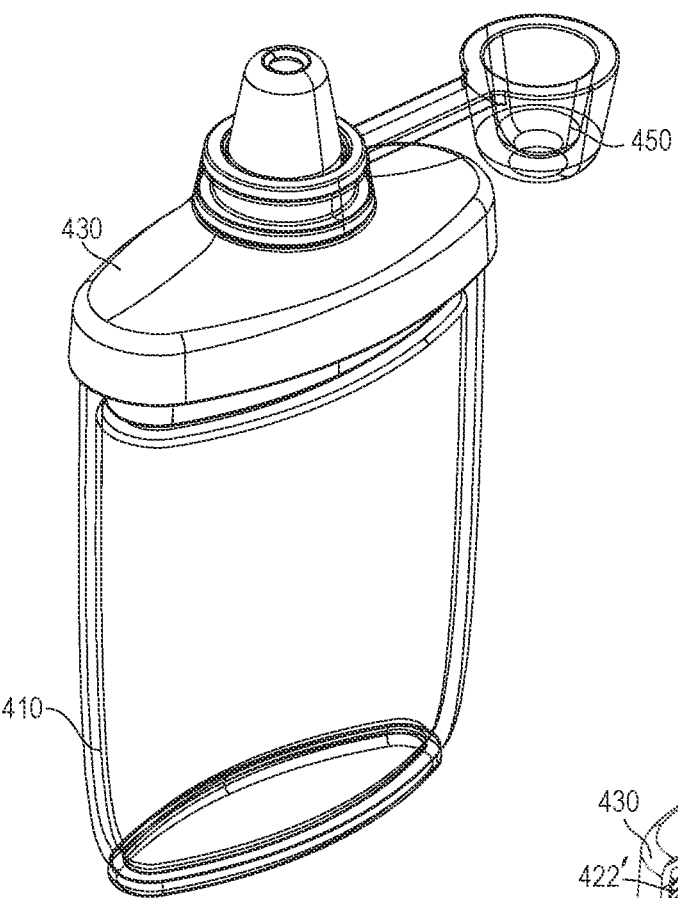
FIG. 18A is a perspective view of another embodiment of a storage container of this disclosure.
Figure 18B:
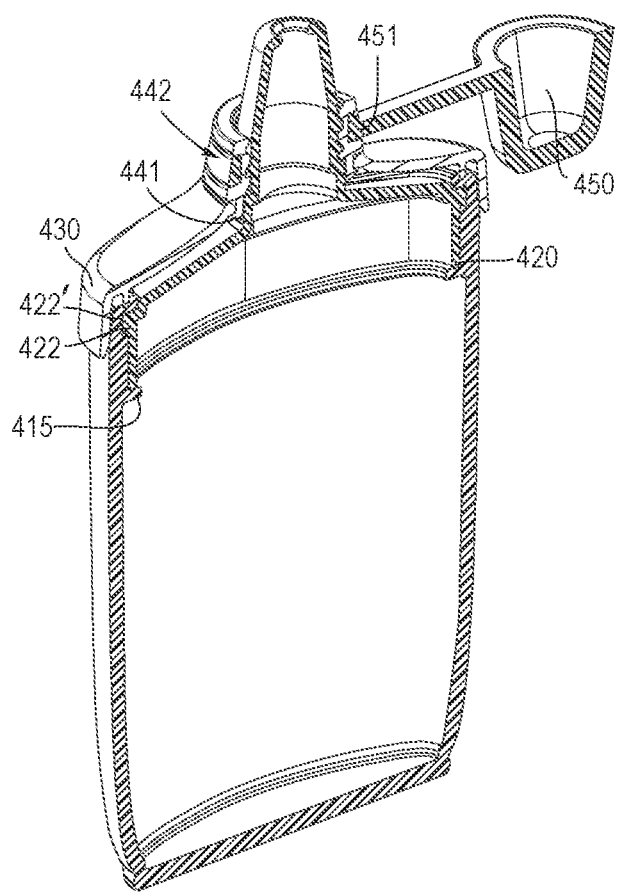
FIG. 18B is a cross-sectional view of the storage container of FIG. 18A.
Figure 18C:
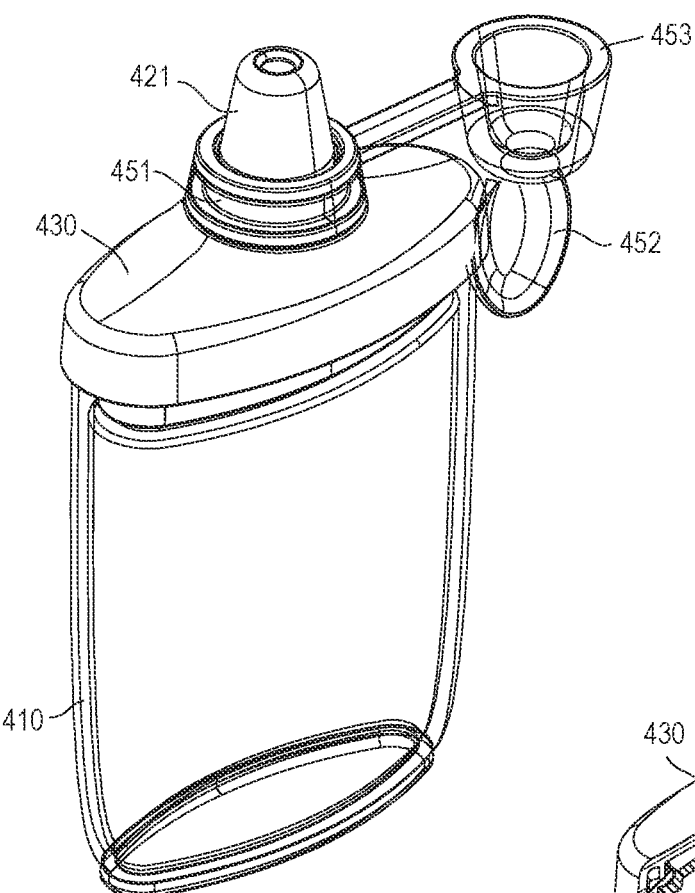
FIG. 18C is a perspective view of another embodiment of a storage container of this disclosure.
Figure 18D:
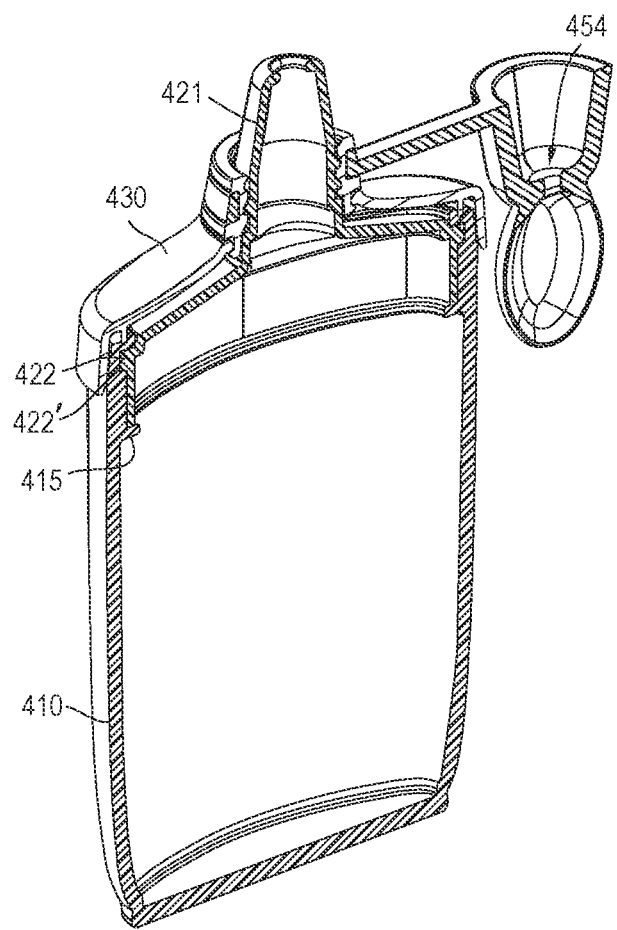
FIG. 18D is a cross-sectional view of the storage container of FIG. 18C.
Figure 18E:
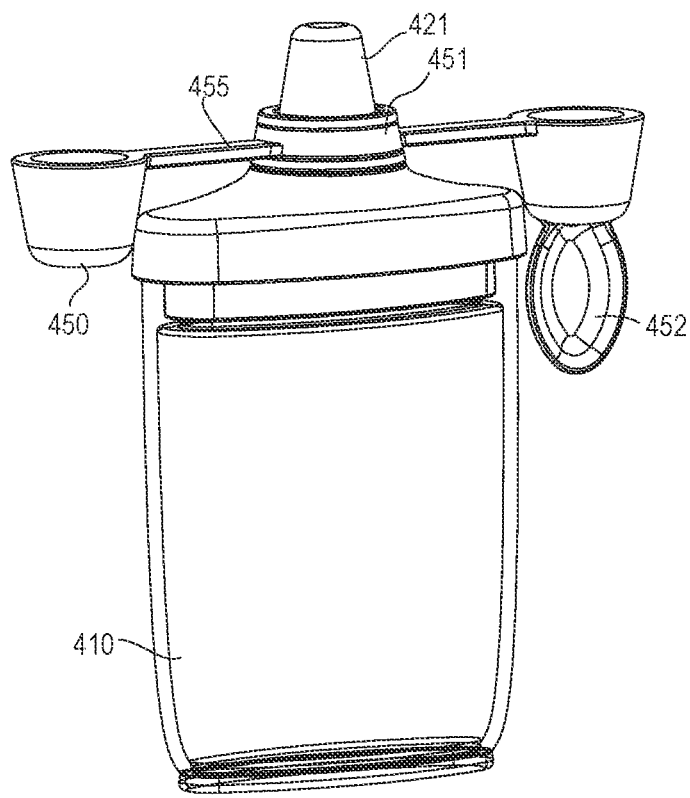
FIG. 18E is a perspective view of another embodiment of a storage container of this disclosure.
Figure 18F:
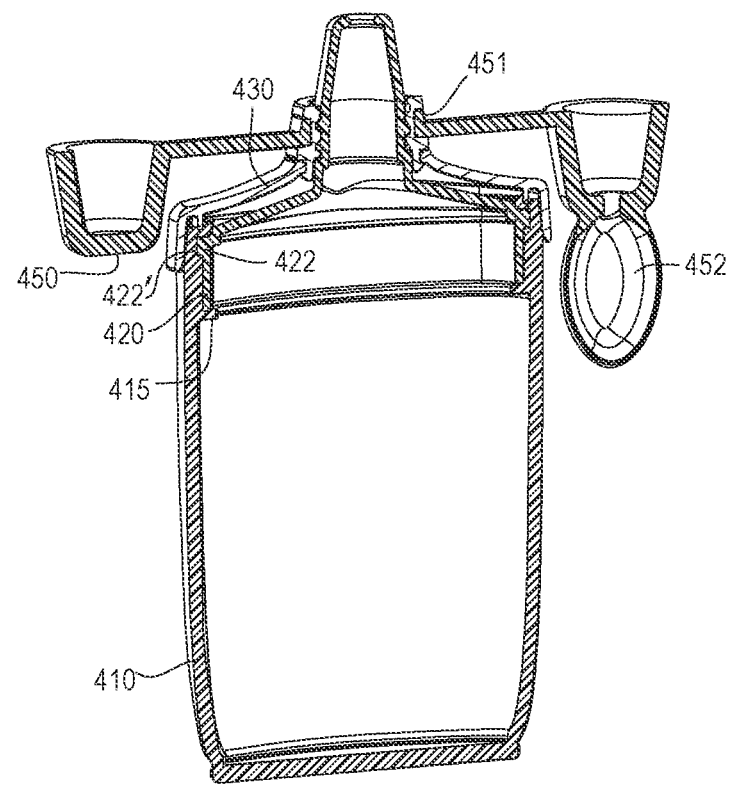
FIG. 18F is a cross-sectional view of the storage container of FIG. 18E.
Figure 18G:
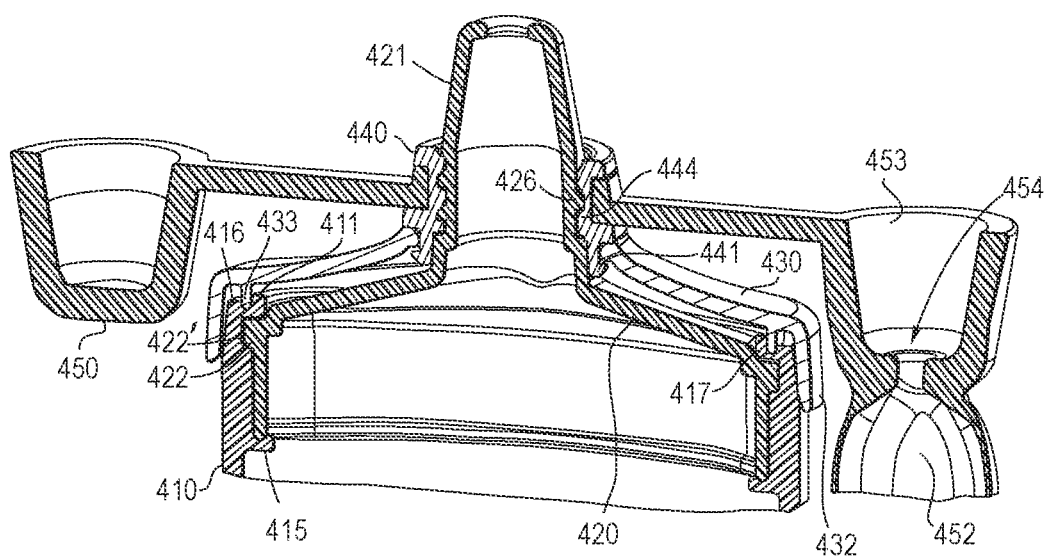
FIG. 18G is an enlarged cross-sectional view of the storage container of FIG. 18E.
Figure 18H:
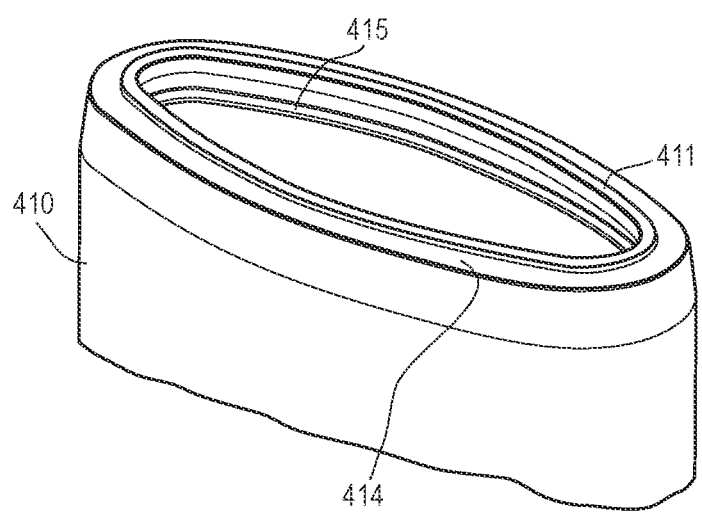
FIGS. 18H-K are perspective views of the components of the storage containers of FIGS. 18A, C, and E.
Figure 18I:
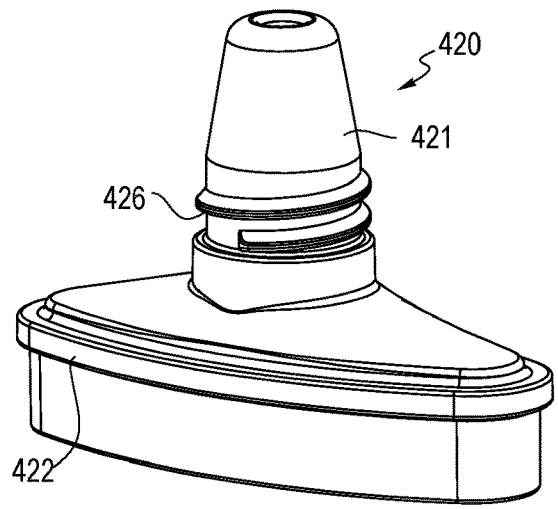
Figure 18J:
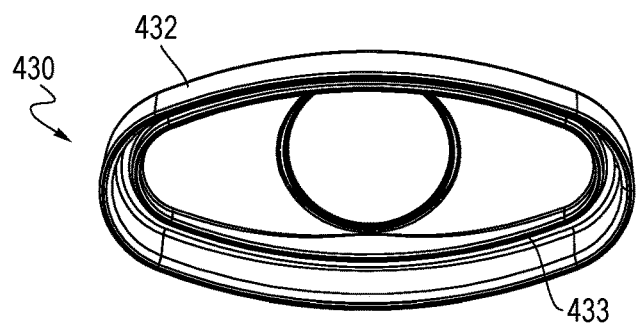

More specifically, the base 410 may be made of an elastomer, and when the inner skirt 433 pushes downward (e.g., via tightening of screw cap 440), the lip 417 is elastically deformed by the inner skirt 433 (as shown in FIGS. 16D and 18G) to form the channel. In another embodiment, the channel can be pre-modeled, so that the channel exists even without the inner skirt's 433 pressure. The lip 417 may alternatively include another rib 416 thereon to form the channel, where the ribs 411 and 416 sandwich the inner skirt 433 (as shown in FIGS. 16D and 18G). The rib 411 may be, but is not limited to, approximately 1 mm in height and 2 mm in width. In one implementation, the side wall of the inner skirt 433 touches the side wall of the rib 411. For example, the inner skirt 433 may compress the rib 411 between the inner skirt 433 and a surface of the inner insert 420. Further, as shown in FIG. 19C, the inner skirt 433 and the periphery of the inner insert 420 may sandwich the lip 417 to form a close and/or compression fit.

Further, the outer base cap 430 includes an outer skirt 432. The outer skirt 432 compresses the walls of the base 410 in an inward direction. For example, the upper side walls of the base 410 may have an annular ramp proximate to the upper opening, such that the outer edge of the base 410 expands gradually outward from the opening of the base 410, as shown in FIG. 16D. In this way, the outer base cap 430 is sized and shaped to exert inward pressure on the side walls of the base 410 when the outer base cap 430 is pushed downward along with the annular ramp of the base 410.

Exemplarily, the base 410 may have annular protrusion 415 positioned proximate the opening of the base 410 and extending radially inward to engage the inner insert 420. The annular protrusion 415 of the base 410 may act as a stop and support a side wall of the inner insert 420 extending downward into the base 410. Further, the inner insert 420 may include at least one annular protrusion 422. The annular protrusions 422 extending radially outward may engage the inner surface of the base 410 to form a compression fit between the inner insert 420 and the outer skirt 432 of the outer base cap 430. The base 410 correspondingly may include a channel 422' to receive the annular protrusions 422. The annular protrusion 422 may further sandwich the lip 417 of the base 410 with the inner skirt 433 of the inner insert 420.

The storage container may further include a screw cap 440, which serves the similar function as to the screw cap 208 of the other embodiments disclosed above. To assemble the components of the storage containers, a user inserts the inner insert 420 into the base 410. The inner insert 420 may form a compression fit within the base 410. The annular protrusion 422 will fit into the channel 422' of the base 410. The annular protrusion 415 of the base 410 may stop the inner side wall of the inner insert 420. Then, the user covers the inner insert 420 with the outer base cap 430. The spout 421 of the inner insert 420 goes through the opening of the outer base cap 430. Then, the user screws the screw cap 440 onto the inner insert 420 with the threads 444 of the screw cap 440 and threads 426 of the inner insert 420. As a user rotates the screw cap 440, the screw cap 440 may push the outer base cap 430 downward, such that the outer base cap 430 pushes the inner skirt 433 of the outer base cap 430 downward and into compression with the lip 417. Additionally, as the outer base cap 430 is pushed downward via rotation of the screw cap 440, the outer skirt 432 of the outer base cap 430 is pushed downward and into compression with the walls of the base 410, sandwiched between the outer skirt 432 and the inner insert 420.

As described above for the other embodiments, the screw cap 440 may optionally include one or more extensions 441 (as shown in FIG. 18G) projecting downward toward the outer base cap 430 when the screw cap 440 is threaded onto the spout 421, such that the screw cap 440 and/or the extensions 441 compress the outer base cap 430 between the inner insert 420 and the screw cap 440, further securing the inner insert 420 and the outer base cap 430 to the base 410.

Figure 18K:
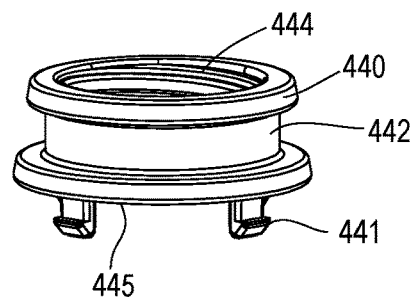
Figure 18L:
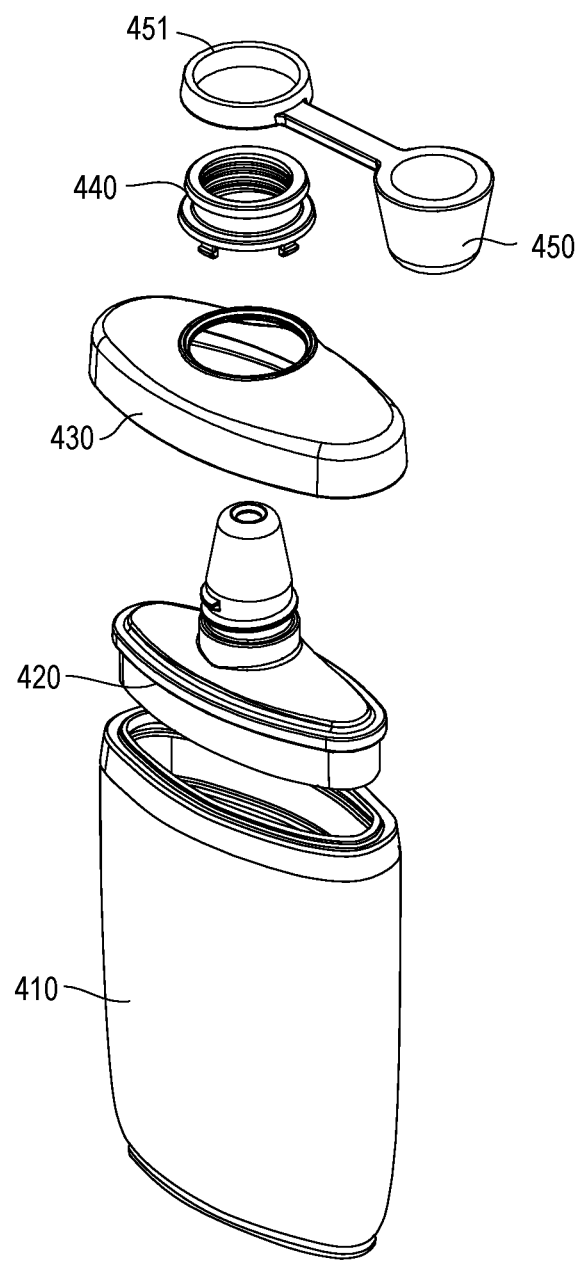
FIG. 18L is an exploded view of the storage container of FIG. 18A.

Further in one embodiment, the extensions 441 may have one or more fasteners, such as a hook in a J shape, to engage with the outer base cap 430. As shown in FIGS. 18G and 18K, the hook has a ramp, which touches the outer base cap 430 when the screw cap 440 is screwed downward toward the inner insert 420. The hooks of the extensions 441 will enter the opening of the outer base cap 430 and be positioned between the inner insert 420 and the outer base cap 430. The extension 441, therefore, forms a ledge to engage the periphery of the opening of the outer base cap 430. The fasteners may extend both downward and radially outward from the bottom of the screw cap 440. The bottom 445 (as shown in FIGS. 16D and 18K) of the screw cap 440 may therefore engage with the periphery of the opening of the outer base cap 430 because its diameter is larger than the diameter of the opening of the outer base cap 430, so as to engage with the periphery of the opening of the outer base cap 430 and to compress the outer base cap 430 between the inner insert 420 and the screw cap 440, further securing the inner insert 420 and the outer base cap 430 to the base 410.

In one embodiment, the screw cap 440 forms a neck 442 for housing a ring 451 of the spout cap 450. As shown in FIGS. 18A-E, the ring 451 may be connected to different attachments. For example, the spout cap 450 may have a spoon 452 attached to the cap 453. The cap 453 forms a channel 454 to connect the channel of the spout 421 and the bowl of the spoon 452. Thus, the bowl can receive the food or liquid coming from the spout 421 when the cap 453 is caped onto the spout 421. In one embodiment, the spout cap 450 may have multiple arms 455 to connect to multiple caps/attachments. For example, as shown in FIGS. 18E and F, the spout cap 450 has a regular cap and a cap with a spoon. FIG. 18G shows an enlarged cross-sectional view of the storage container of FIG. 18E. The structure of FIG. 18E may apply to the storage containers of FIGS. 18A and 18C as well. FIGS. 18H-K show some common components of the storage containers of FIGS. 18A, C, and E. In an implementation, the base 410 may be made of or comprise an elastomer, such silicone. Further, the inner insert can be made of or comprise a rigid material.

Figure 18M:
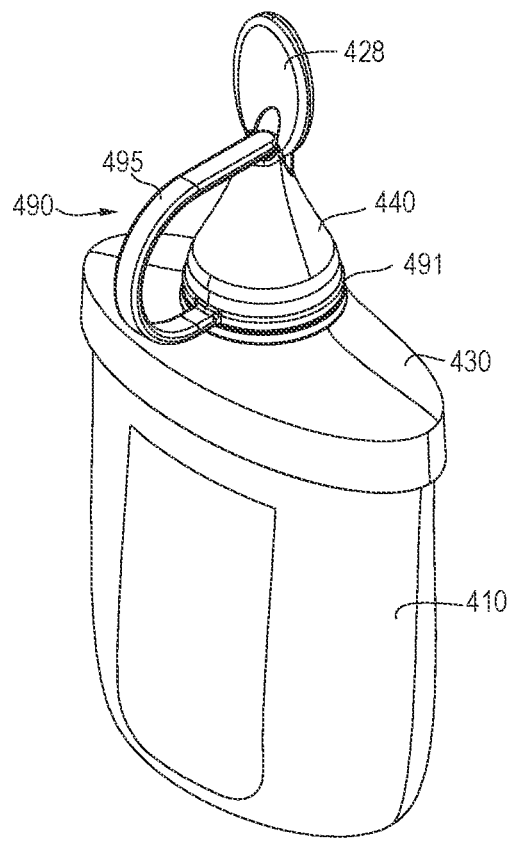
FIG. 18M shows another embodiment of a storage container of this disclosure.
Figure 18N:
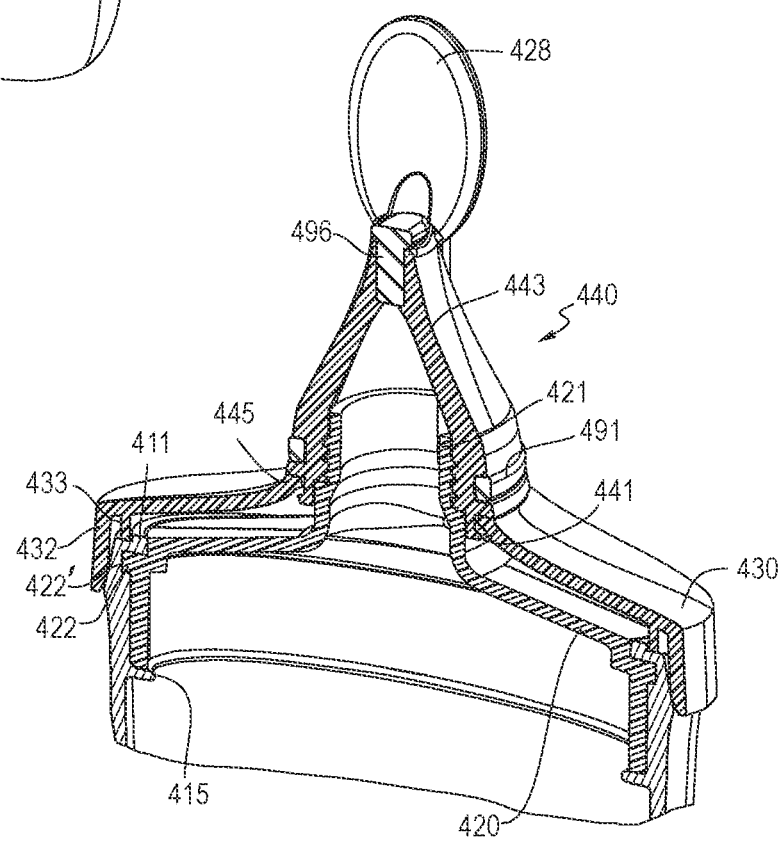
FIG. 18N shows a cross-sectional view of the storage container of FIG. 18M.

FIG. 18M shows another embodiment of a storage container of this disclosure. FIG. 18N shows a cross-sectional view of the storage container of FIG. 18M. The storage container of FIG. 18M has similar structures and functions as those of the storage containers in FIGS. 18A, C, D described above. However, a spoon 428 with a bowl is not attached to a cap 453, like the storage container in FIG. 18G. Instead, the spoon 428 here is positioned next to the exist of the storage container. Specifically, the spoon 428 can be positioned at an upper terminal of the spout outlet 443. The spoon 428 can be of a unitary construction with the screw cap 440. Additionally, the spout 421 here is connected to a spout outlet 443, not the spout 421 in FIG. 18G. The screw cap 440 with the spoon 428 here can be screwed up onto the spout 421. Additionally, the storage container in FIGS. 18M and N has a spout stopper 490, including a stopper 496, an arm 495, and a ring 491. The ring 491 functions and is structured similarly to ring 451. The arm 495 extends from the ring 491. The stopper 496 is configured at the end of the arm 495. The stopper 496 may be perpendicular to the arm 495. The stopper 496 is shaped and sized to seal the opening of the spout outlet 443. It should be noted that the design of the spoon 428 and the spout stopper 490 here can be adopted to the other embodiments, such as the storage containers as shown in FIGS. 18A, C, & E, such that the spoon 428 can extend from the spout 421 in FIGS. 18A, C, & E.

Figure 18O:
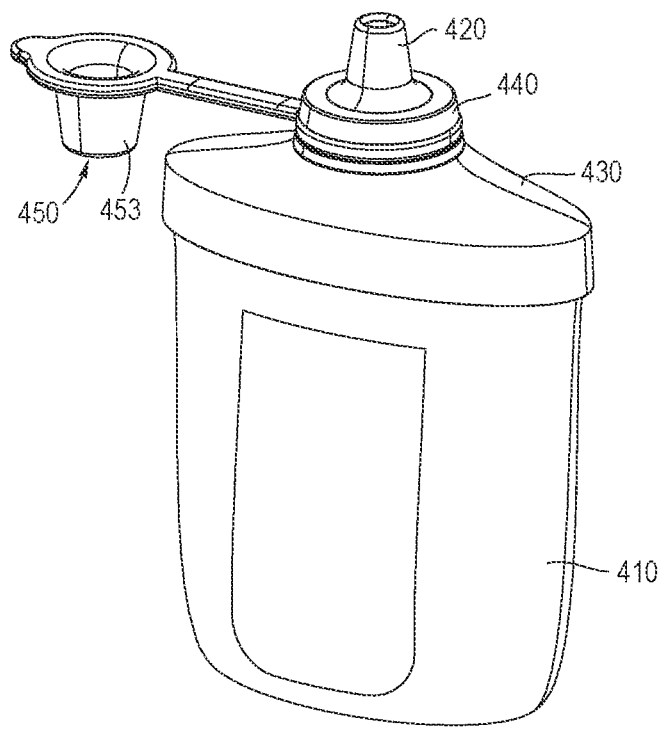
FIG. 18O shows another embodiment of a storage container of this disclosure.
Figure 18P:
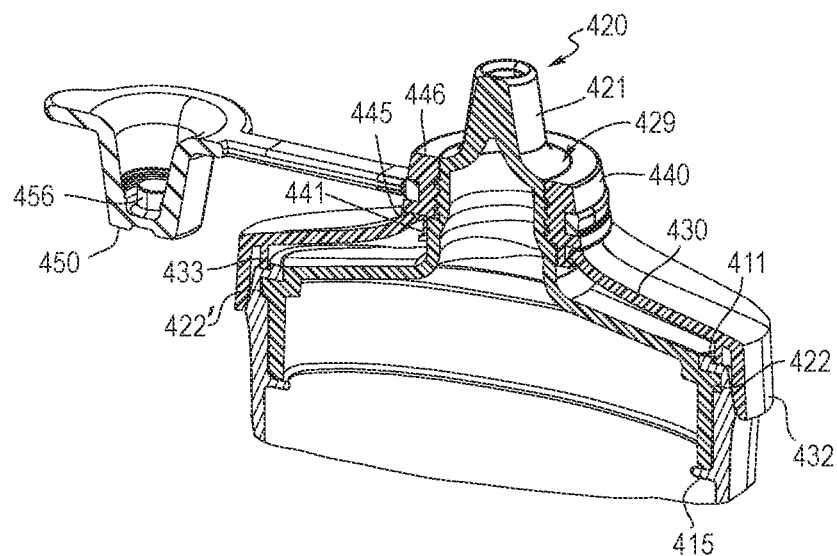
FIG. 18P shows a cross-sectional view of the storage container of FIG. 18O.

In another embodiment, the storage container as shown in FIG. 18O has a spout cap 450, including a cap 453. A stopper 456 is situated in the bottom of the cap 453. The stopper 456 is sized and shaped to seal the channel of the spout 421. Additionally, the spout 421 of the inner insert 421 has a curvature 429 next to the periphery of the opening of the screw cap 440. The curvature 429 creates a substantially seamless engagement between the top surface 446 of the screw cap 440 and the side wall of the spout 421. Further, the bottom 445 of the screw cap 440 touches the periphery of the opening of the outer base cap 430 and thereby pushes the outer base cap 430 downwardly when the screw cap 440 is rotated in a downward direction.

Figure 19A:
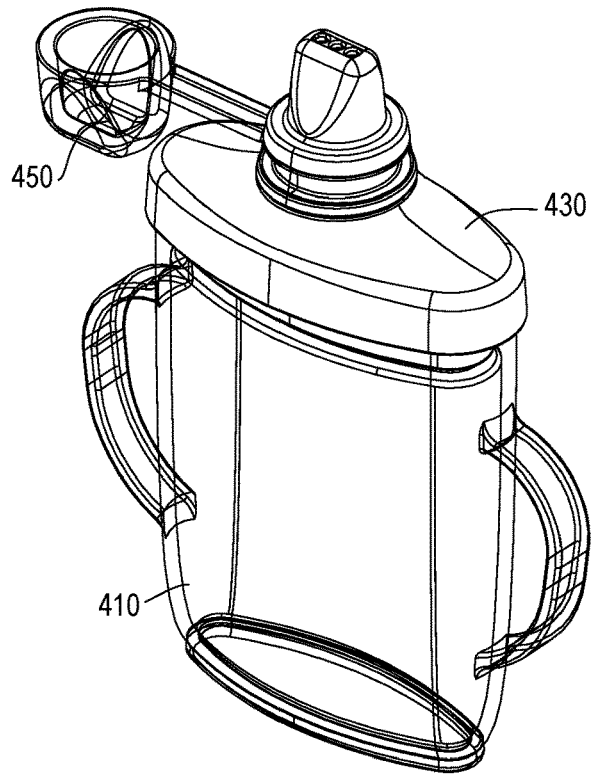
FIG. 19A is a perspective view of another embodiment of a storage container of this disclosure.
Figure 19B:
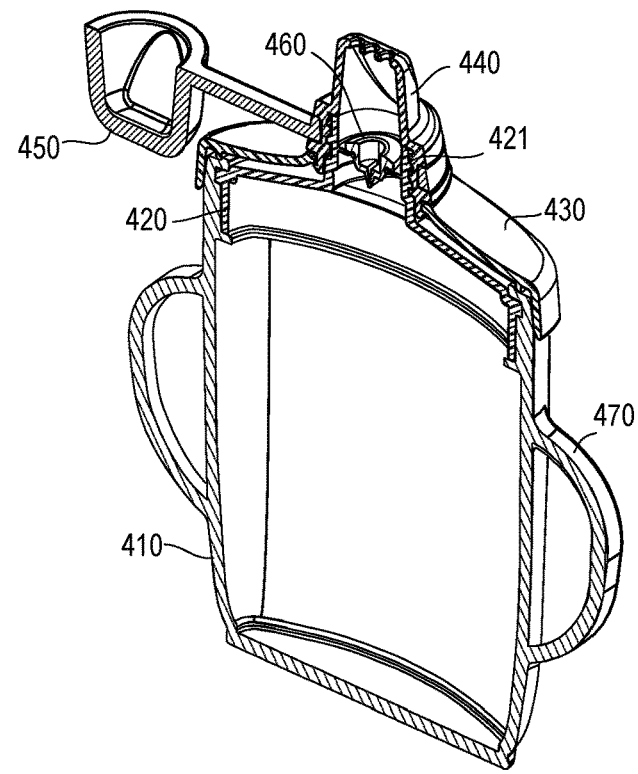
FIG. 19B is a cross-sectional view of the storage container of FIG. 19A.
Figure 19C:
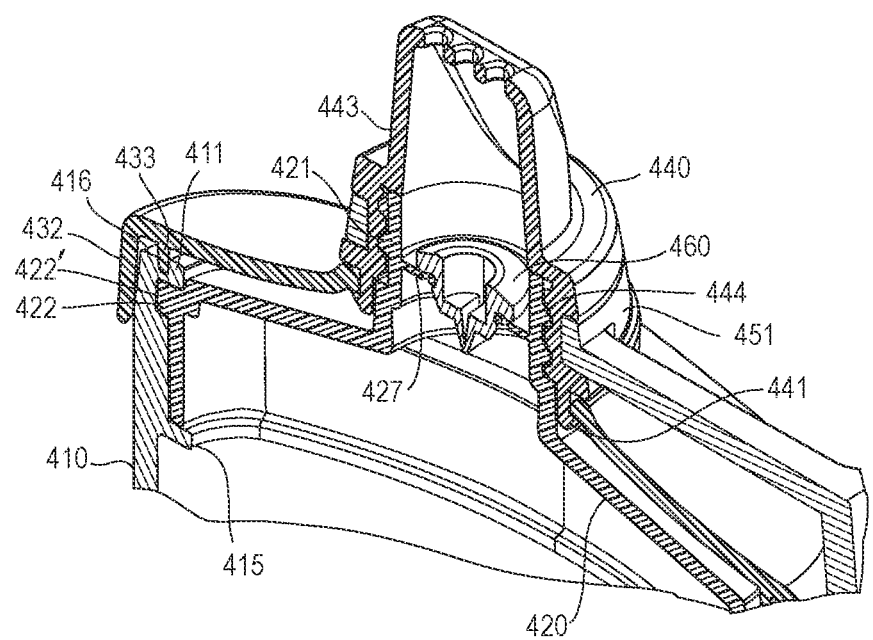
FIG. 19C is an enlarged cross-sectional view of the storage container of FIG. 19A.
Figure 19D:
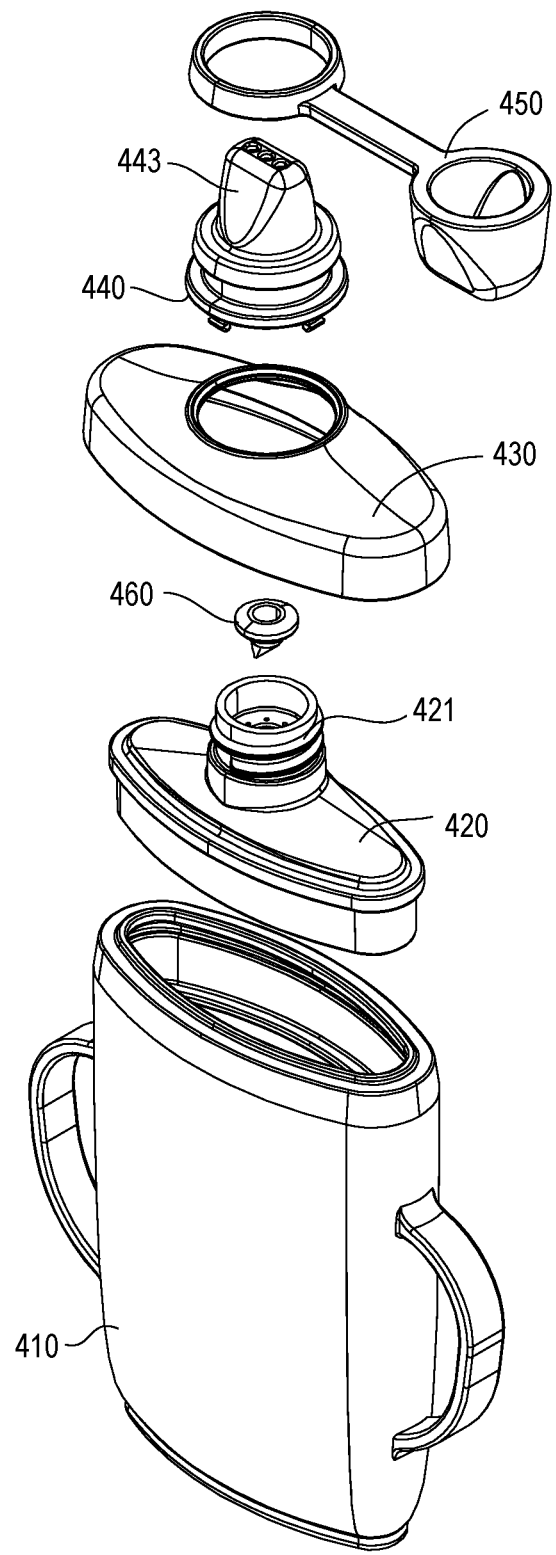
FIG. 19D is an exploded view of the storage container of FIG. 19A.

In another embodiment, the storage containers as shown in FIGS. 19A, B, C, and E have an inner insert 420 with a spout 421. The spout 421 in this embodiment serves as a part of a larger spout formed in connection with the screw cap 440. Here, the screw cap 440 includes a spout outlet 443 in fluid connection with the spout 421. The spout outlet 443 has multiple smaller openings as compared to the embodiments above. This implementation of the spout 421 and the spout outlet 443 can also be applied to the embodiments described above. The storage container further includes a valve 460. The valve 460 is shaped and sized to attach to the channel of the inner insert 420, and can be used to control the flow of the food or liquid in the channel of the spout 421, such that food or liquid may flow out of the storage container in response to a positive threshold pressure in the storage container, or a negative threshold pressure in the spout 421. The channel of the inner insert 420 may have an inwardly projecting lip 427 (as shown in FIGS. 19C and F) to fix the valve 460 in the channel of the inner insert 420. The inwardly projecting lip 427 may form a hole (as shown in FIG. 19H) to receive the valve 460. Correspondingly, the valve 460 may include a neck, and the edge of the hole of the lip 427 engages with the neck of the valve 460.

Figure 19E:
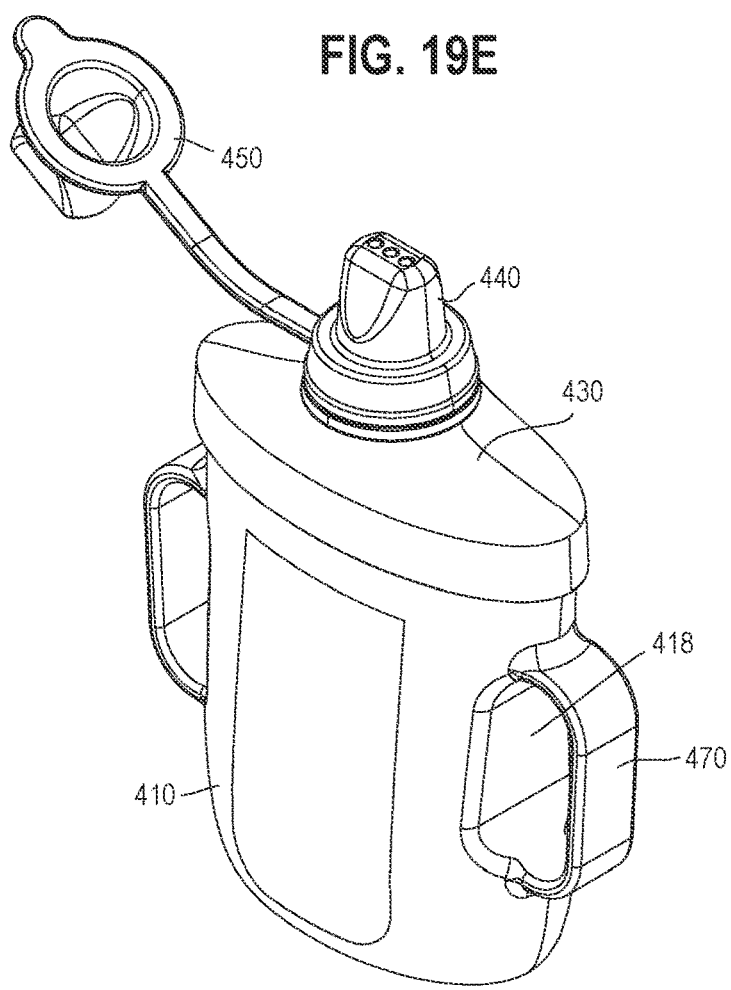
FIG. 19E shows another embodiment of a storage container of this disclosure.
Figure 19F:
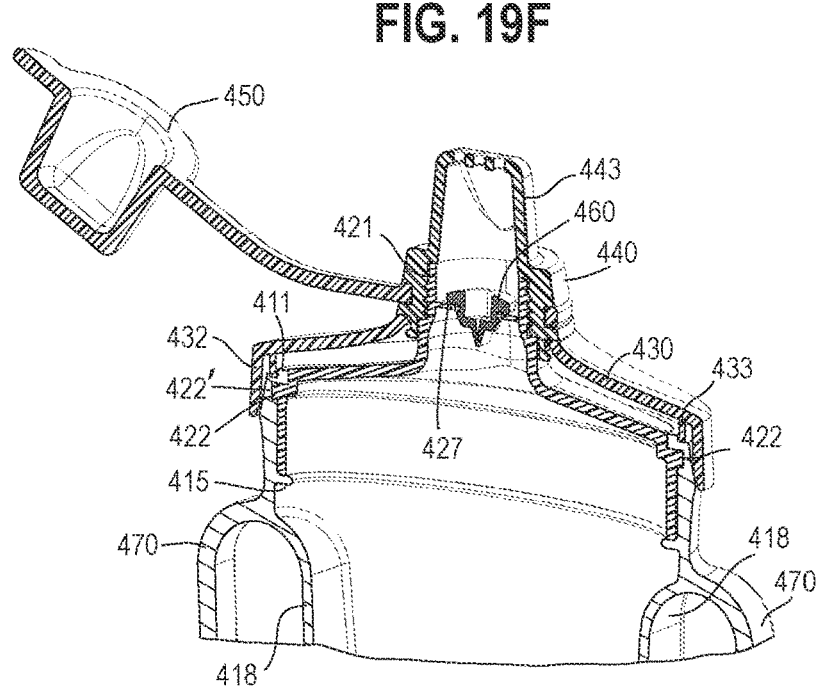
FIG. 19F shows a cross-sectional view of the storage container of FIG. 19E.
Figure 19G:
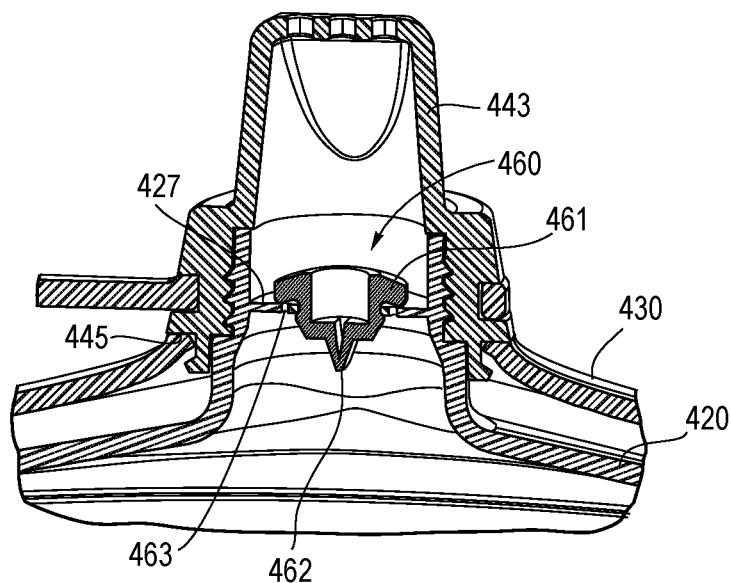
FIG. 19G shows an enlarged cross-sectional view of the storage container of FIG. 19E.
Figure 19H:
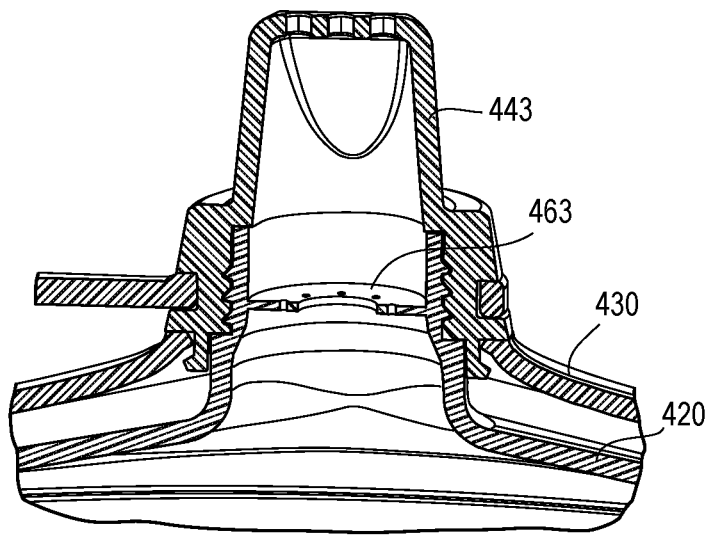
FIG. 19H shows an enlarged cross-sectional view of the storage container of FIG. 19E with the valve removed.

FIG. 19G shows an enlarged view of the storage container of FIG. 19E, focused on the valve 460. The valve 460 in FIGS. 19A to H may be similar. The valve 460 may be shaped like a duckbill. Specifically, the lip 427 may include one or more channels 463. The one or more channels 463 allow contents stored in the storage container to flow to the spout outlet 443, when the valve 460 is opened. The one or more channels 463 may be formed on the inwardly projecting lip 427 of the inner insert 420, and the one or more channels 463 may be arranged evenly around the hole defined by the lip 427 of the inner insert 420. Additionally, the valve 460 includes an annular lip 461. The annular lip 461 may be shaped like an umbrella and sized to cover the one or more channels 463. The annular lip 461 therefore prevents the stored content in the container from flowing out unless there is a positive threshold pressure in the storage container, or a negative threshold pressure in the spout outlet 443. The valve 460, including the annular lip 461, may comprise an elastomer; therefore, when the pressure in the storage container is sufficient, the lip 461 is deformed to allow the stored contents to flow out from the one or more channels 463. When the pressure disappears, the shape and position of the annular lip 461 restore to cover the one or more channels 463. The valve 460 may also include leaflets 462, which may open, due to the negative pressure in the storage container, to allow air, residual food, or liquid in the spout outlet 443 to flow back to the container via the channel in the middle of the valve 460 when the leaflets 462 are opened. Allowing air to flow back into the container also permits the container to return to its original shape, if squeezed to force contents contained therein through the spout outlet 443.

Figure 20A:
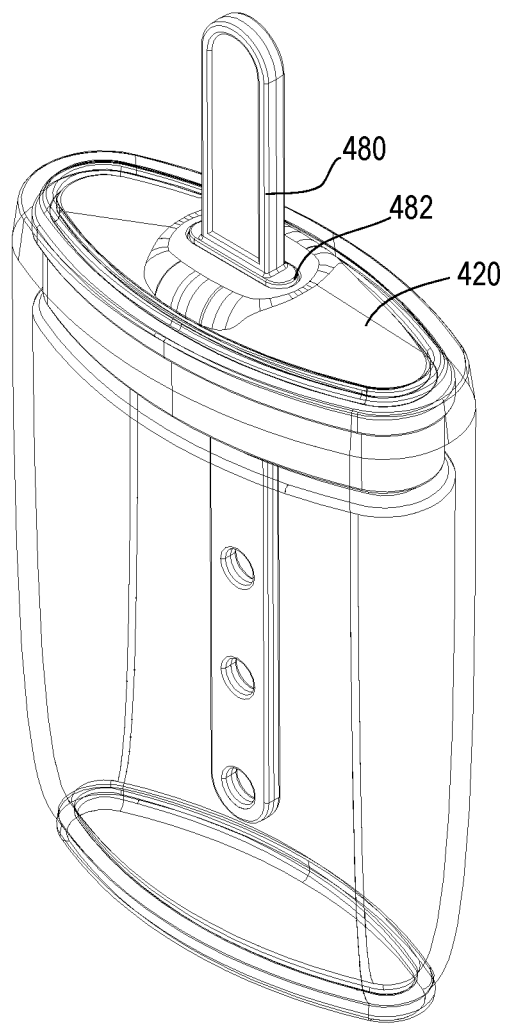
FIG. 20A is a perspective view of another embodiment of a storage container of this disclosure.
Figure 20B:
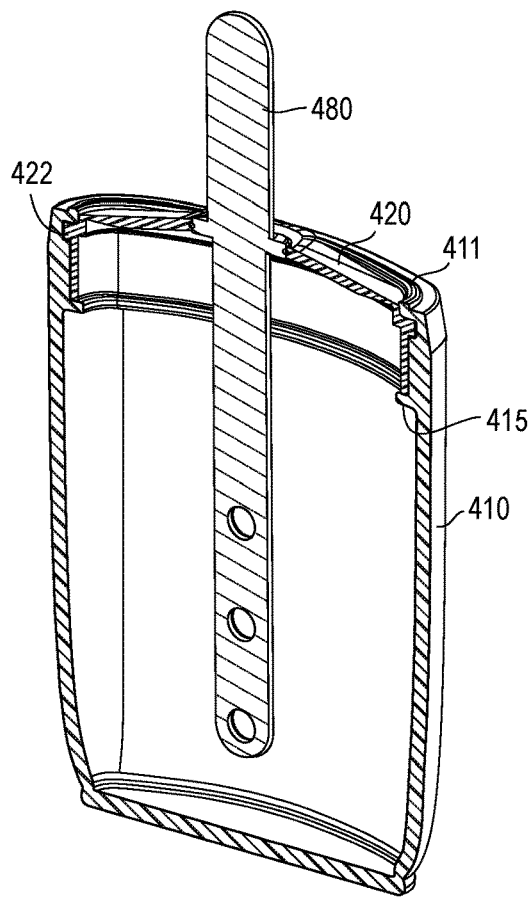
FIG. 20B is a cross-sectional view of the storage container of FIG. 20A.

As shown in FIG. 19D, which is an exploded view of the storage container of FIG. 19A, the screw cap 440 here includes a spout outlet 443. The spout outlet 443 is connected to the spout 421 of the inner insert 420 and receives the food or liquid from the channel of the spout 421. The lower portion of the screw cap 440 has a similar configuration as to the other screw caps 440 described above. In an implementation, the base 410 may be made of or comprise an elastomer, such silicone. Further, the inner insert can be made of or comprise a rigid material. As shown in FIGS. 19A and 19E, the storage container may further include at least one handle 470 attached to the base 410. Additionally, as shown in FIG. 19 E, the storage container may further include notch 418 on the base 410. The inner side wall of the handle 470 and the side wall of the notch 418 define an opening. FIGS. 20A-B show another embodiment of a storage container of this disclosure. The storage container here can be used as a popsicle cup. The container includes a base 410 and an inner insert 420. The base 410 has a plurality of side walls forming an interior and an opening at an upper edge of the base 410. The inner insert 420 is positioned in the opening of the base 410 and sized and shaped to contact the plurality of side walls. Exemplarily, the base 410 may have annular protrusion 415 positioned proximate the opening of the base 410 and extending radially inward to engage the inner insert 420.

Further, the inner insert 420 may include at least one annular protrusion 422. The annular protrusions 422 extending radially outward may engage the inner surface of the base 410 to form a compression fit, for example, proximate the opening of the base 410. The base 410 may correspondingly have an annular channel 422' to receive the annular protrusions 422.

Figure 20C:
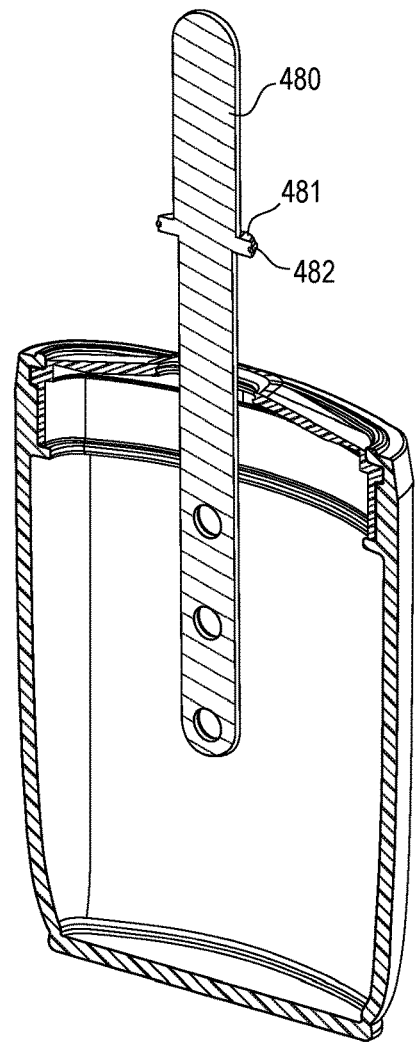
FIG. 20C is an exploded, cross-sectional view of the storage container of FIG. 20A.

The inner insert 420 forms an opening to allow a stick 480 to extend through the opening. The stick 480 may form multiple holes on one end to serve as an anchor for forming a popsicle. The stick 480 may have an intermediate portion 481 having a width larger that the adjacent portions, as shown in FIG. 20C. The intermediate portion 481 is configured to engage with the periphery of the opening of the inner insert 420 directly or indirectly. Optionally, the stick may include a sealing ring 482 around the intermediate portion 481. The sealing ring 482 may help the container prevent leakage. In an implementation, the base 410 may be made of or comprise an elastomer, such silicone. Further, the inner insert can be made of or comprise a rigid material.

Figure 20D:
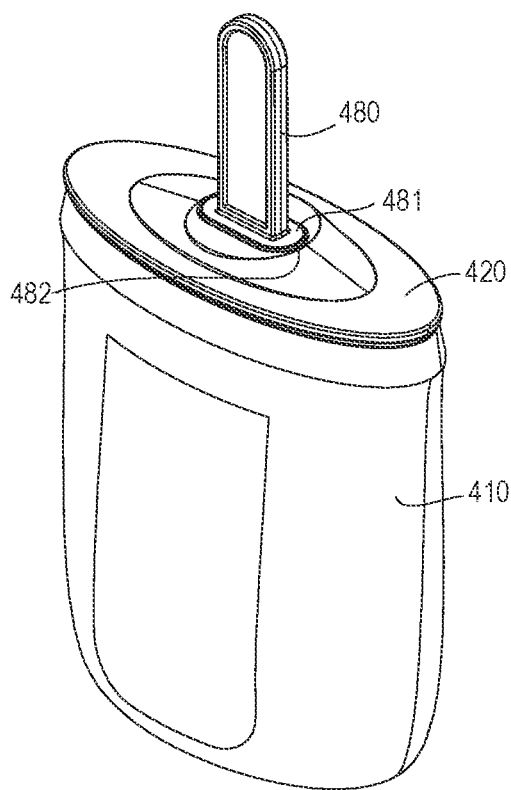
FIGS. 20D-E show another embodiment of a storage container of this disclosure.
Figure 20E:
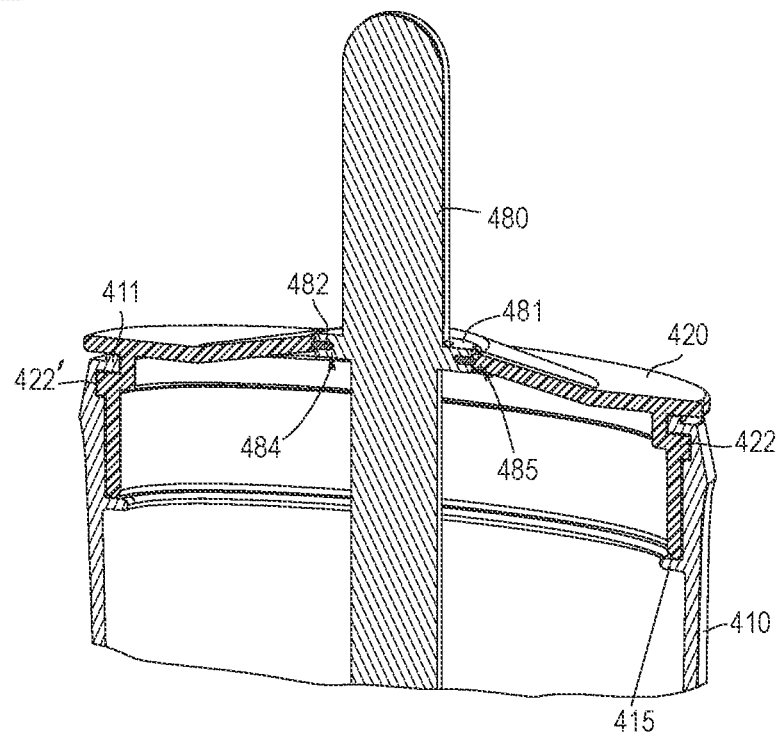

FIGS. 20D-E show another embodiment of a storage container of this disclosure. The storage container here can be used as a popsicle cup as well. The structures and functions of the storage container in FIGS. 20D-E are similar to the storage container as shown in FIGS. 20A-B. However, the top layer of the inner insert 420 here covers the upward-facing rib 411 formed next to the periphery of the opening of the base 410. The top layer of the inner insert 420 extends outwardly beyond the rib 411. Further, the intermediate portion 481 of the stick 480 is thicker than the top layer of the inner insert 420 around the intermediate portion 481 of the stick 480. As described above, the ring 482 is embedded between the intermediate portion 481 and the inner insert 420 when the stick 480 is assembled with the inner insert 420. Further, the depth of the engagement of the ring 482 with the intermediate portion 481 is larger than the depth of the engagement of the ring 482 with the layer of the inner insert 420. Specifically, the intermediate portion 481 and the periphery of the opening of inner insert 420 may form channels 484, 485 to receive the ring 482. The depth of the channel 484 of the intermediate portion 481 of the stick 480 is larger than the depth of the channel 485 of the inner insert 420 as shown in FIG. 20E.

Figure 21A:
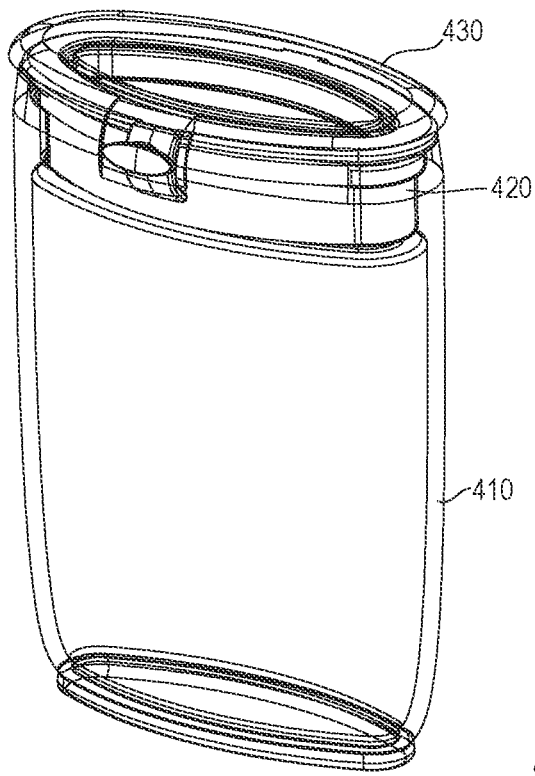
FIG. 21A is a perspective view of another embodiment of a storage container of this disclosure.
Figure 21B:
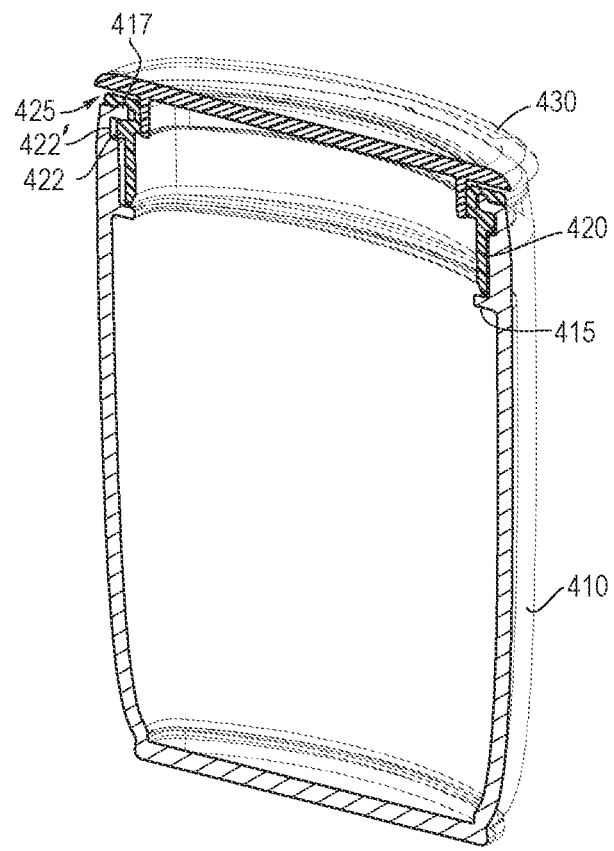
FIG. 21B is a cross-sectional view of the storage container of FIG. 21A.

FIGS. 21A-B show still another embodiment of a storage container of this disclosure. The storage container includes a base 410, an inner insert 420, and an outer base cap 430. The base 410 has a plurality of side walls forming an interior and an opening at an upper edge of the base 410. The inner insert 420 is positioned in the opening of the base 410, and it is sized and shaped to contact the plurality of side walls. The outer base cap 430 is positioned over the inner insert 420. The inner insert 420 may comprise an annular channel 425 to receive an inward-facing annular lip 417 of the base 410. The inner insert 420 here also has at least one annular protrusion 422. The annular protrusions 422 extends radially outward and may engage the inner surface of the base 410 to form a compression fit. The base 410 may correspondingly have a channel 422' to receive the annular protrusions 422. The base 410 similarly may include an annular protrusion 415, which serves the similar function as to the annular protrusion 415 of the other embodiments.

Figure 21C:
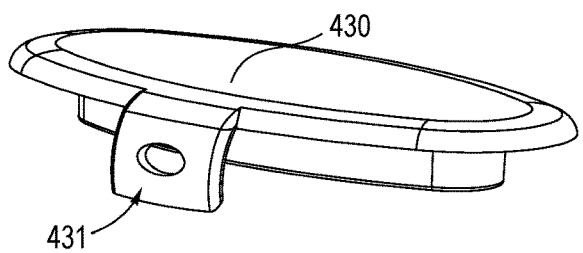
FIGS. 21C-D are perspective views of the components of the storage container of FIG. 21A.
Figure 21D:
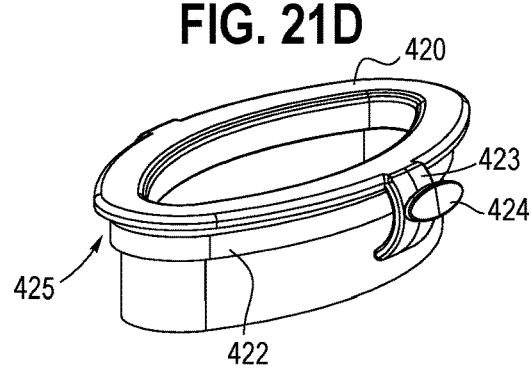
Figure 21E:
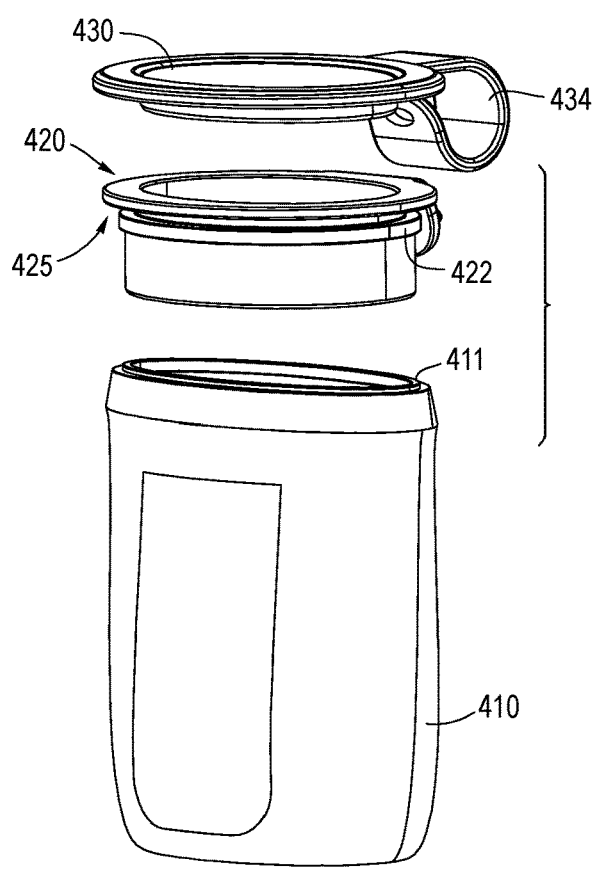
FIG. 21E shows another embodiment of a storage container of this disclosure.

FIGS. 21C-D show the inner insert 420 and the outer base cap 430 of the storage container in FIGS. 21A-B. The inner insert 420 may include an ear 423. The ear 423 may touch the side wall of the base 410. Optionally, the ear 423 may include a fastener, such as a button 424. The button 424 is configured to be fastened with the button hole 431 on the outer base cap 430. The inner insert 420 here also has at least one annular protrusion 422. In an implementation, the base 410 may be made of or comprise an elastomer, such silicone. Further, the inner insert can be made of or comprise a rigid material.

FIGS. 21E to 21H show another embodiment of a storage container of this disclosure. The storage container of FIGS. 21E to 21H is constructed and functions similar to the storage container in FIGS. 21A-B. Additionally, there are some main differences as follows. Exemplarily, the outer base cap 430 here may have a curved extension 434, where a button hole situated.

Figure 21F:
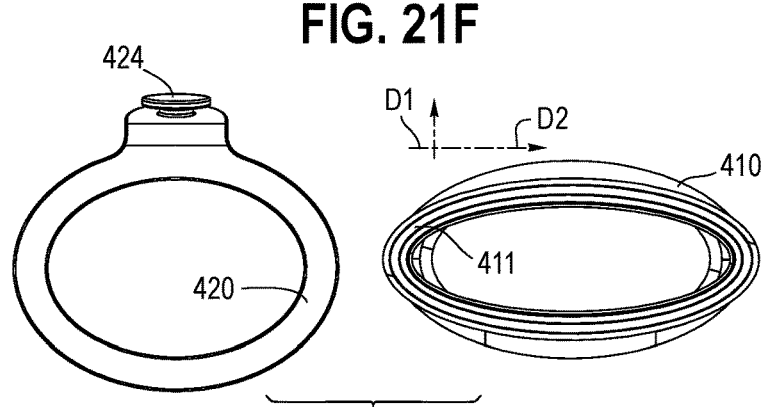
FIG. 21F shows a top view of the storage container of FIG. 21E without the base cap.
Figure 21G:
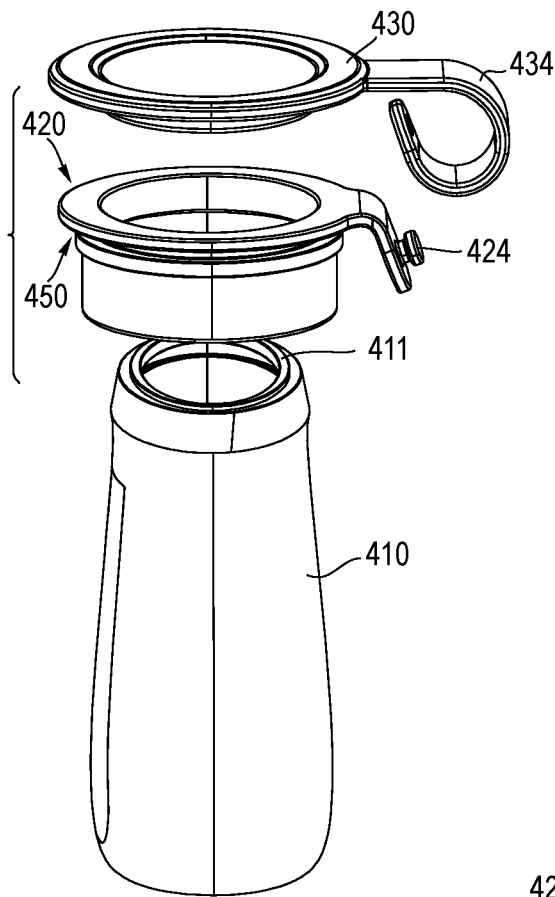
FIG. 21G shows a side view of the container of FIG. 21E.
Figure 21H:
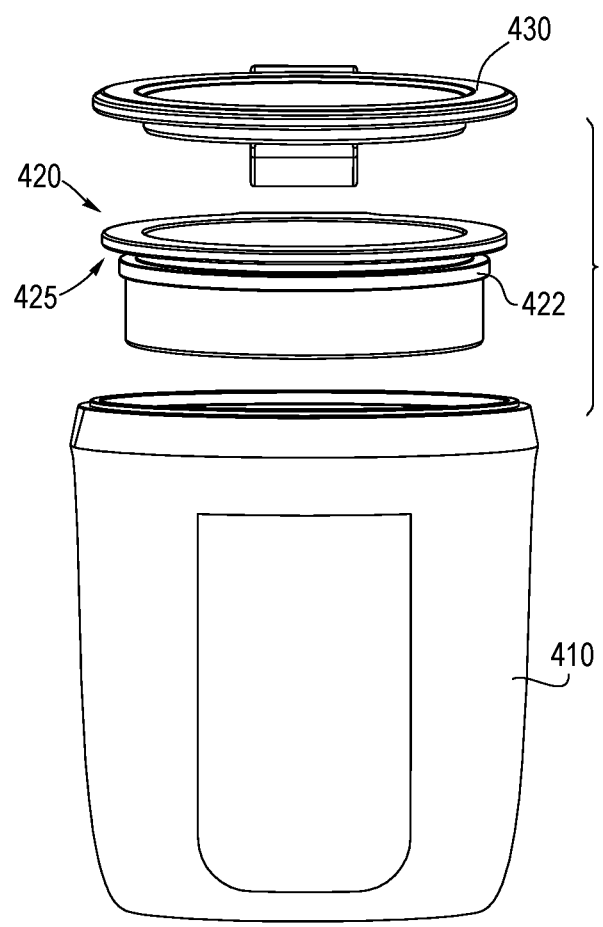
FIG. 21H shows a front view of the container of FIG. 21E.

Further, as shown in FIG. 21F, the opening of the base 410 may be not contoured with the periphery of the inner insert 420 before the base 410 and the inner insert 420 are assembled together. For example, the opening of the base 410 may have a width larger than the width of the inner insert 420 along a first direction D1, while the opening of the base 410 may have a width smaller than the width of the inner insert 420 along a second direction D2 perpendicular to the first direction D1 before the base 410 and the inner insert 420 are assembled together. Alternatively, the opening of the base 410 may have a width smaller than the width of the inner insert along both a first direction D1 and a second direction D2 perpendicular to the first direction D1 before the base 410 and the inner insert 420 are assembled together. The width of the base 410 in the first direction D1 may, however, be identical or different from the width of the base 410 in the second direction D2. Thus, the elastomeric base 410 and the rigid of the inner insert 420 do not fit together unless the base 410 is stretched and deformed to fit around the inner insert 420. Here and as in the other embodiments of storage containers described herein, the inner insert 420 may have a rigidity larger than the rigidity of the base 410. Exemplarily, the base 410 may include an elastomer, such as silicone. The inner insert 420 may be formed of a rigid plastic, such as polypropylene. Therefore, to assemble the base 410 and the inner insert 420 together, the base 410 may be stretched and/or deformed to fit the contour of the inner insert 420. The deformation may create a tighter fit between the base 410 and the inner insert 420. Again, this mechanism and selection of material can be adopted by the other storage containers described in this disclosure, such as the storage containers in FIGS. 1 to 21.

It should be noted that the size and shape of the storage containers as disclosed herein may vary without departing from the scope of this disclosure, for example, as shown in FIGS. 16A and 17.

Figure 22A:
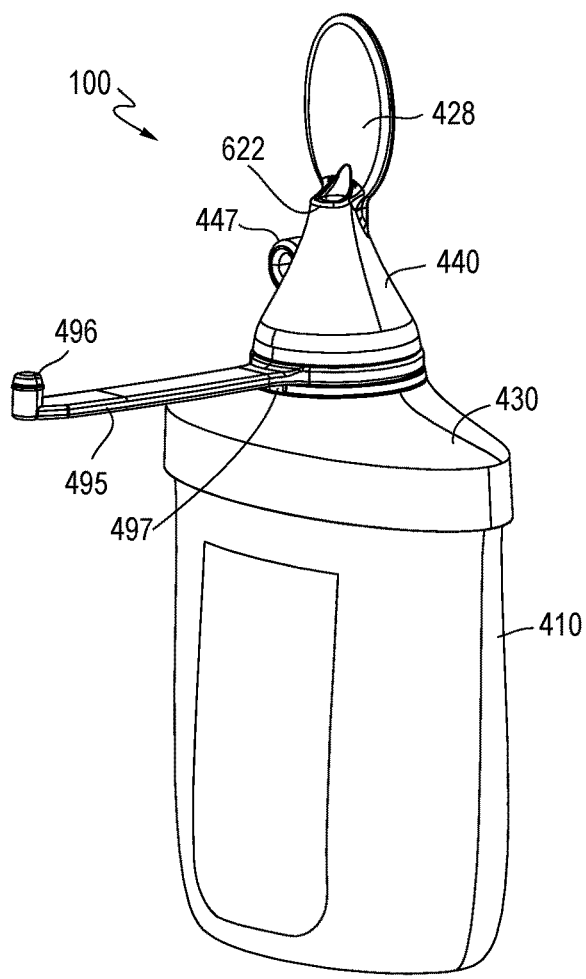
FIG. 22A is a perspective view of another embodiment of a storage container of this disclosure.
Figure 22B:
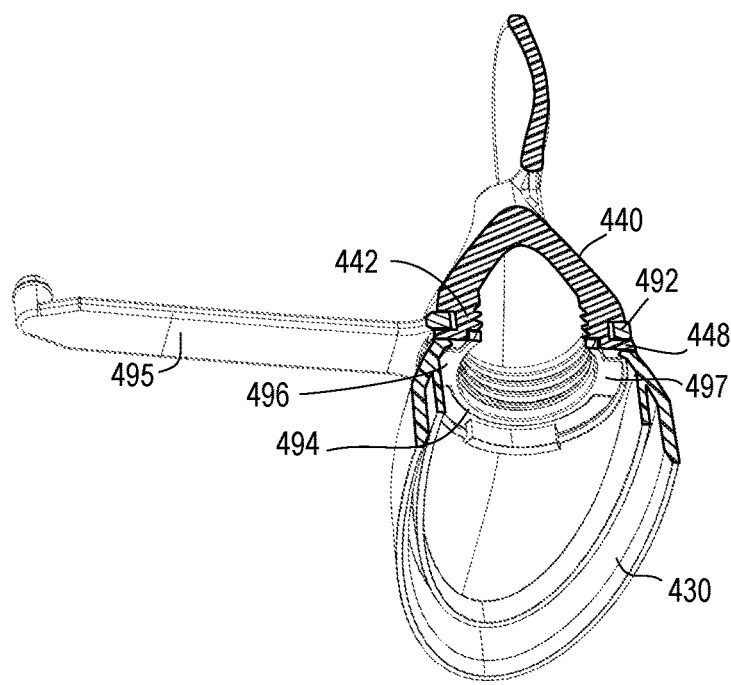
FIG. 22B is a perspective view of the storage container of FIG. 22A when the base and inner insert is removed.
Figure 22C:
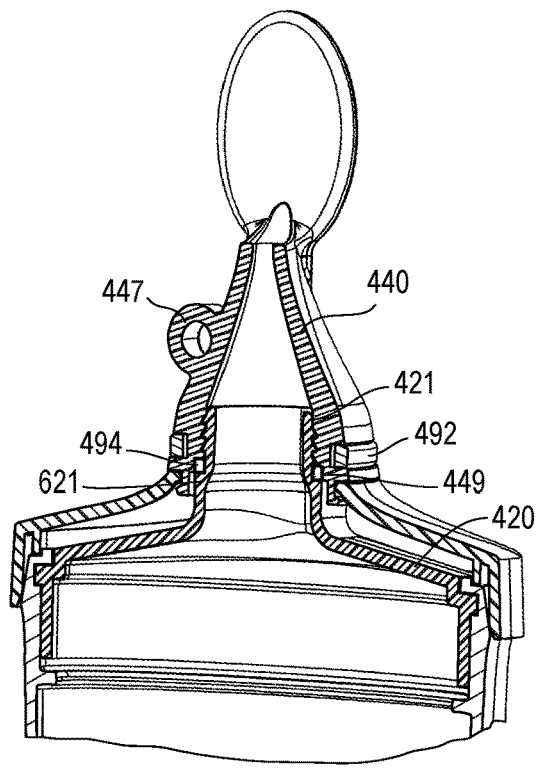
FIG. 22C is a cross-sectional view of the storage container of FIG. 22A.
Figure 22E:
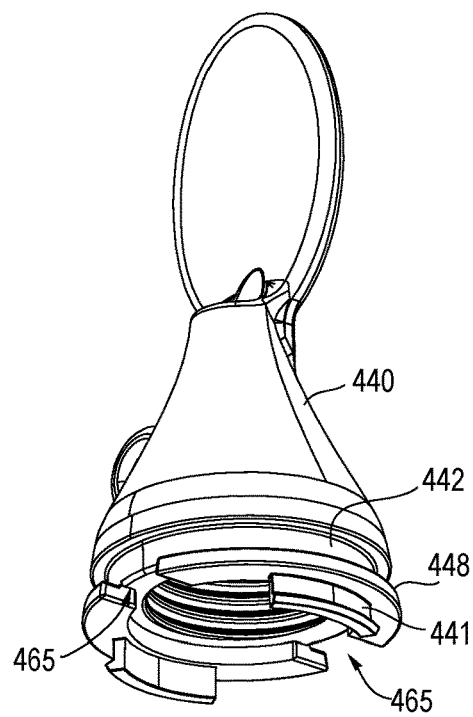
FIGS. 22D-E show different components of the store container of FIG. 22A.

FIG. 22A is a perspective view of another embodiment of a storage container of this disclosure. The storage container in FIG. 22A has similar structures with the storage container as shown in FIGS. 18M and 18N. The description below addresses the main differences of the storage container in FIG. 22A.

Referring to FIGS. 22A-F, the storage container 100 here includes a stopper ring 447 configured to receives the stopper 496. When the stopper 496 is not attached to the outlet 622 of the screw cap 440 (e.g., when the storage container 100 is in use), the stopper ring 447 can receive and position the stopper 496 so that it does not interfere with use of the spoon 428. The stopper ring 447 can be positioned on the screw cap 440. Alternatively, the stopper ring 447 may be positioned on the outer base cap 430.

Figure 22D:
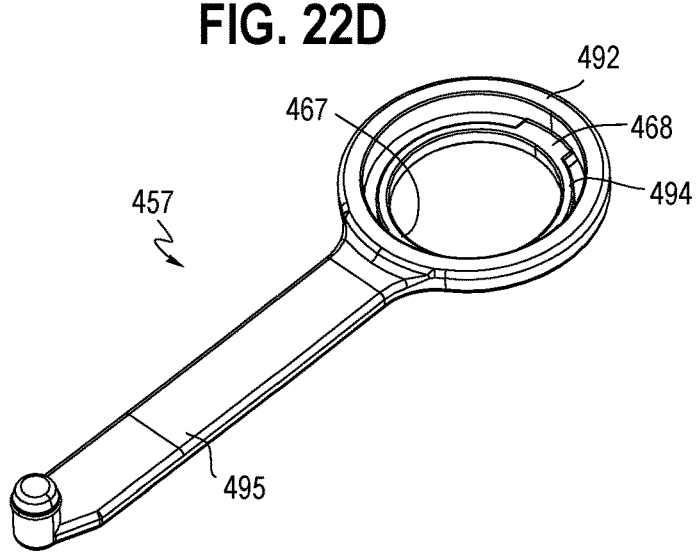
Figure 22F:
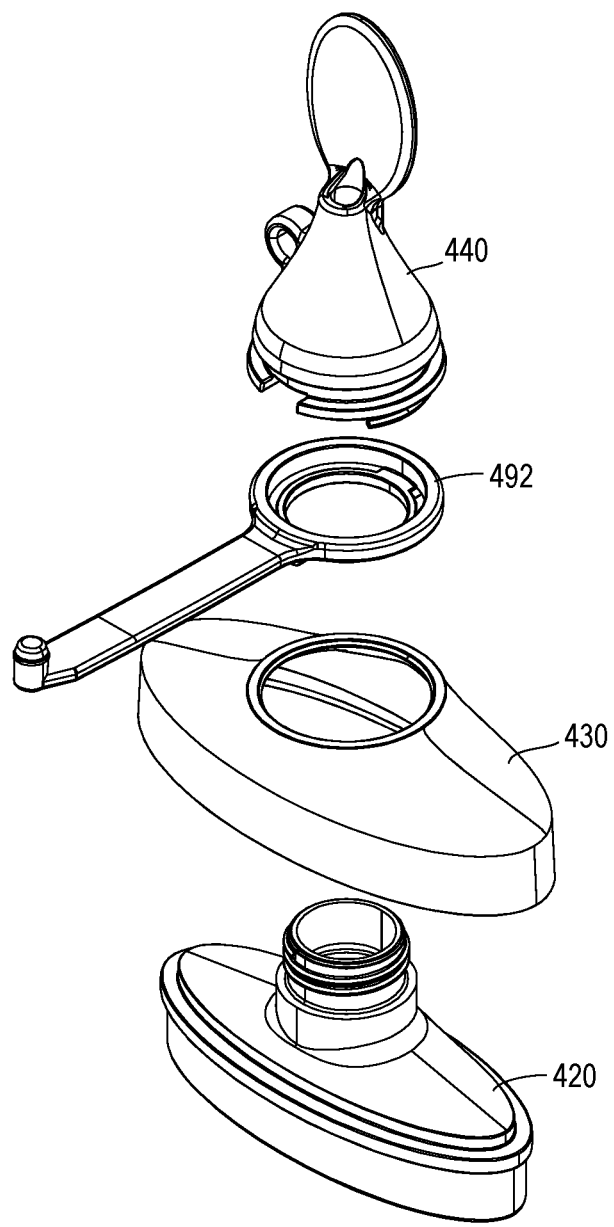
FIG. 22F is a partial exploded view of the storage container of FIG. 22A.

Further the attachment 457 as shown in FIG. 22D may have a different design as compared to the design in FIGS. 18M and 18N. Specifically, the attachment 457 includes a first ring 492 positionable about the neck 442 of the screw cap 440. Additionally, the attachment 457 may include a second ring 494. The ring 494 may be smaller than the ring 492 (e.g. having a smaller diameter). A gap may be formed between the ring 492 and ring 494. When assembled with the screw cap 440 and the ring 492 may be received by the neck 442. The ring 494 may be positioned inside the screw cap 440 and be surrounded by a bottom wall 448 of the screw cap 440. A connecting wall 449 of the inner insert 440 may be situated within the gap between the ring 492 and the ring 494. The ring 494 may be situated between the screw cap 440 and a ledge 621 of the inner insert 420. Additionally, the ring 492 and the ring 494 may be connected together by one or more bridges 496, 497. The bridges 467, 468 may be aligned with the arm 495. When assembled, the bridges 467, 468 can be situated in one or more gaps 465 of the bottom wall 448 of the screw cap 440. The second ring 497 can increase the stability of the connection between the attachment 457 and the screw cap 440. Further, the bridges 467, 468 may prevent the rotation of the attachment 457, given that the bridges 467, 468 are located in the gaps 465.

Figure 23A:
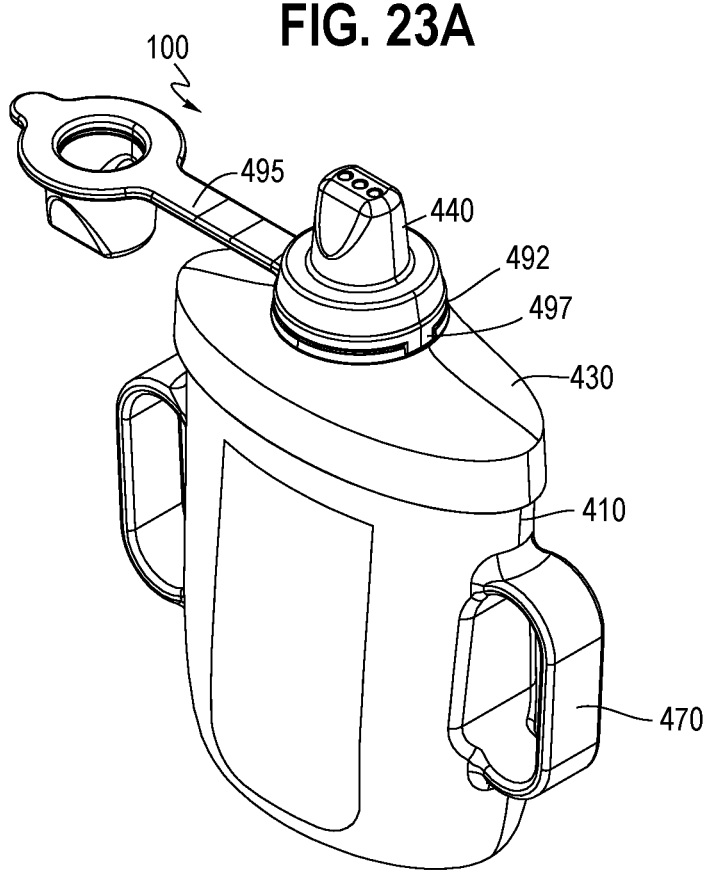
FIG. 23A is a perspective view of another embodiment of a storage container of this disclosure.
Figure 23B:
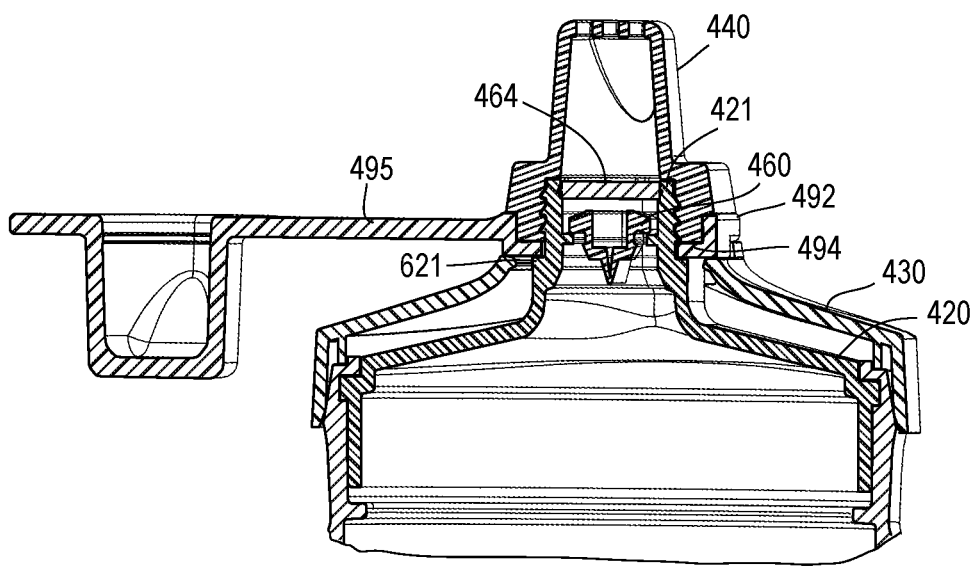
FIG. 23B is a cross-sectional view of the storage container of FIG. 23A.

FIG. 23A is a perspective view of another embodiment of a storage container 100 of this disclosure. FIG. 23B is a cross-sectional view of the storage container 100 of FIG. 23A, and FIGS. 23C-E show different components of the storage container 100 of FIG. 23A. The storage container 100 in FIG. 23A has similar structures with the storage container 100 as shown in FIGS. 19E and 19F. The description below addresses the main differences of the storage container 100 in FIG. 23A.

Figure 23C:
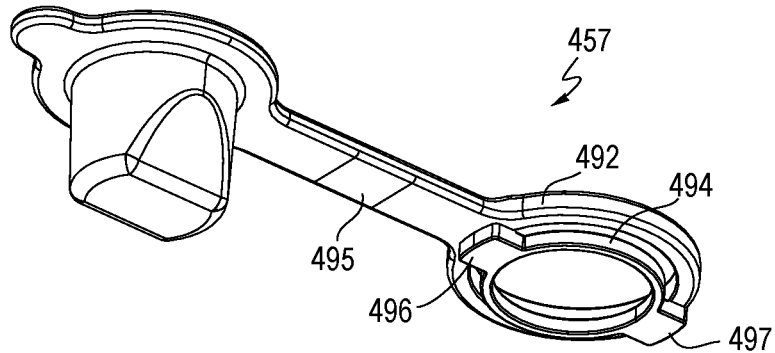
FIGS. 23C-E show different components of the storage container of FIG. 23A.
Figure 23D:
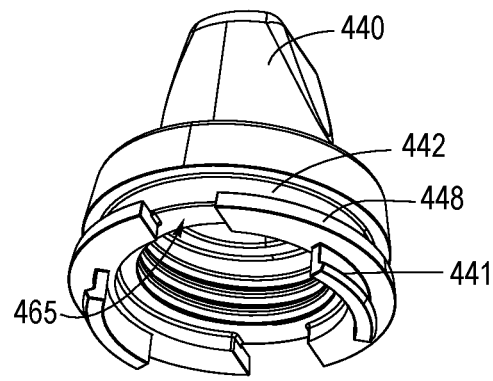
Figure 23E:
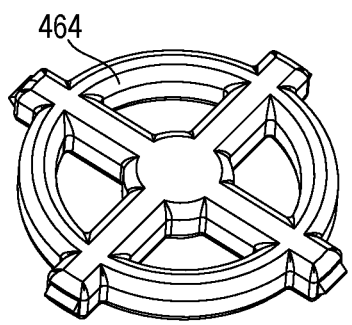

As explained above with reference to FIGS. 19E and 19F, the attachment 457 in FIG. 23C may have a different design as compared to the design in FIGS. 19E and 19F. Specifically, the attachment 457 may include the ring 492 positionable to the neck 442. Additionally, the attachment 457 may include the ring 494. The ring 494 may be smaller than the ring 492 (e.g. having a smaller diameter). A gap may be formed between the ring 492 and ring 494. When assembled with the screw cap 440, the ring 492 may be received by the neck 442. The ring 494 may be positioned inside the screw cap 440 and be surrounded by a bottom wall 448 of the screw cap 440. A connecting wall 449 may be situated within the gap between the ring 492 and the ring 494. The ring 494 may be situated between the screw cap 440 and a ledge 621 of the spout cap 420. Additionally, the ring 492 and the ring 494 may be connected together by one or more bridges 467, 468. The bridges 467, 468 may be aligned with arm 495. When assembled, the bridges 467, 468 can be situated in one or more gaps 465 of the bottom wall 448 of the screw cap 440. Further, the base 410 here may, optionally, include one or more handle 470 like the other embodiments disclosed a Additionally, the storage container 100 may include a barrier 464 to prevent or reduce potential choking hazards, especially for children. The barrier 464 may be situated on the top of the spout 421. For example, the spout 421 may have an annular protrusion configured to support the barrier 464. The barrier 464 may block articles larger than a particular size. For example, the opening of the barrier 464 may be smaller than the valve 460, and thereby, it can block the valve 460 if the valve 460 is detached from the spout 421. Further, the barrier 464 can prevent access to the valve 460 from the outside of the storage container 100. In some embodiments, the barrier 464 may include one or more crossbars to effectively block articles from passing therethrough.

Figure 24A:
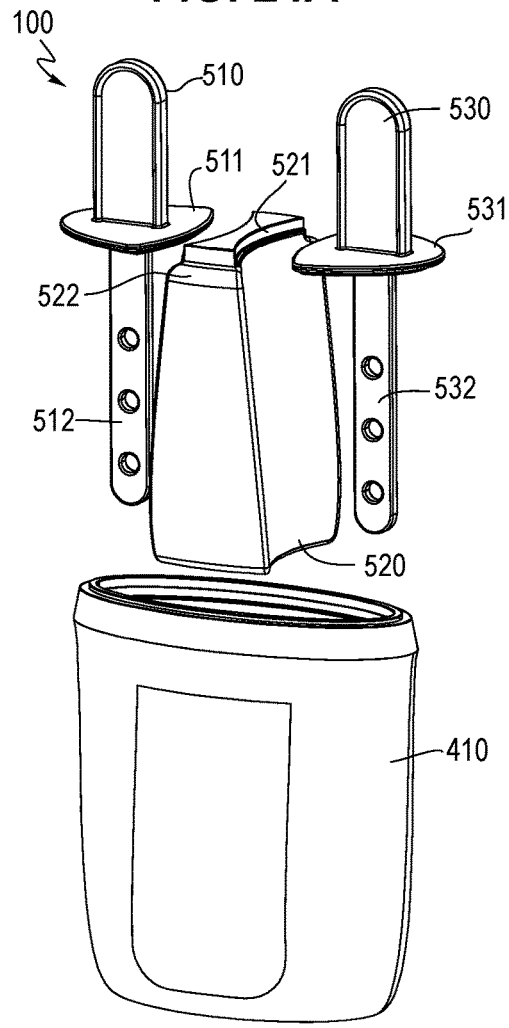
FIG. 24A is a perspective view of another embodiment of a storage container of this disclosure.
Figure 24B:
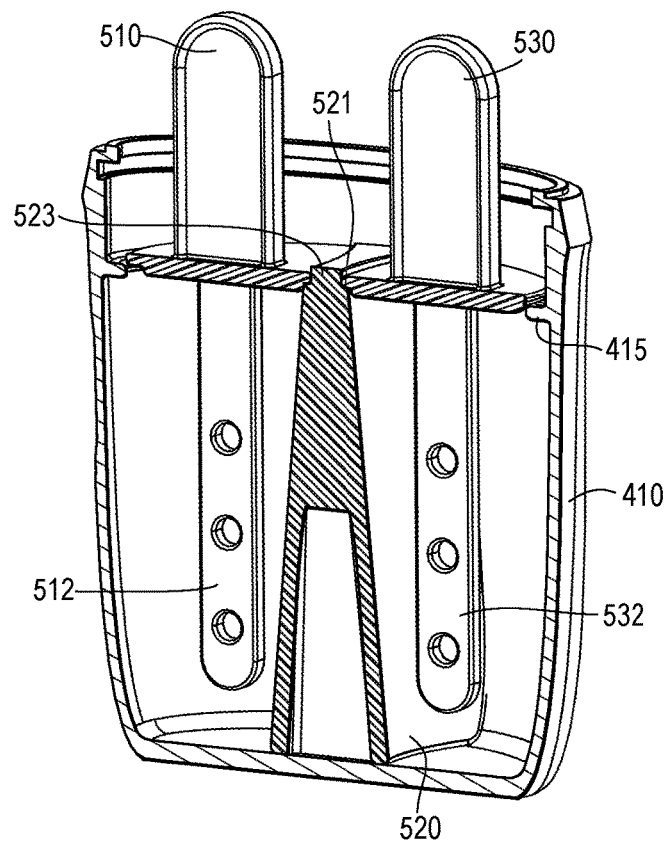
FIG. 24B is a cross-sectional view of the storage container of FIG. 24A.
Figure 24C:
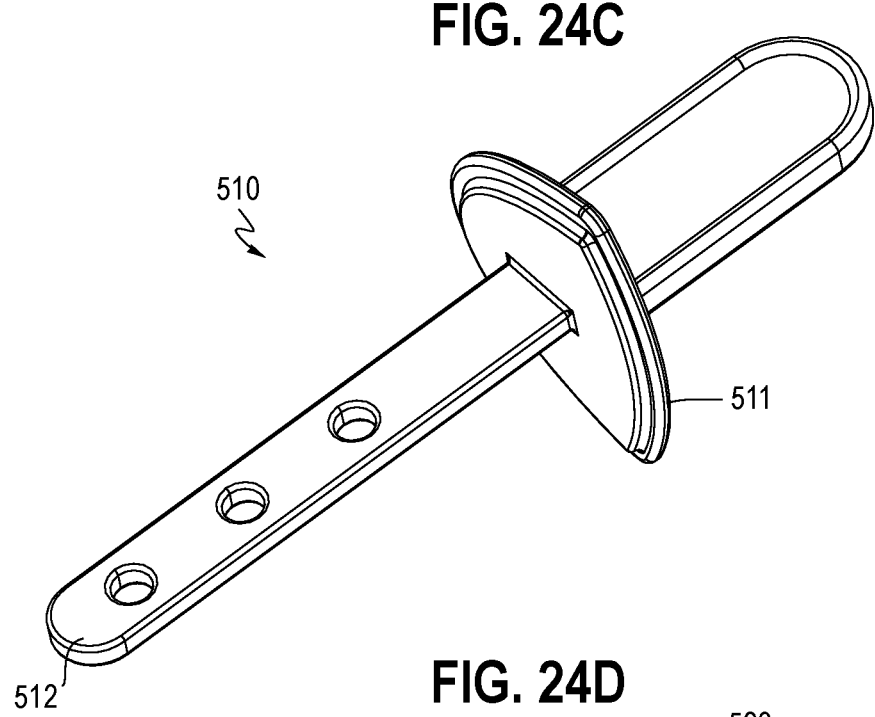
FIGS. 24C-D show different components of the storage container of FIG. 24A.
Figure 24D:
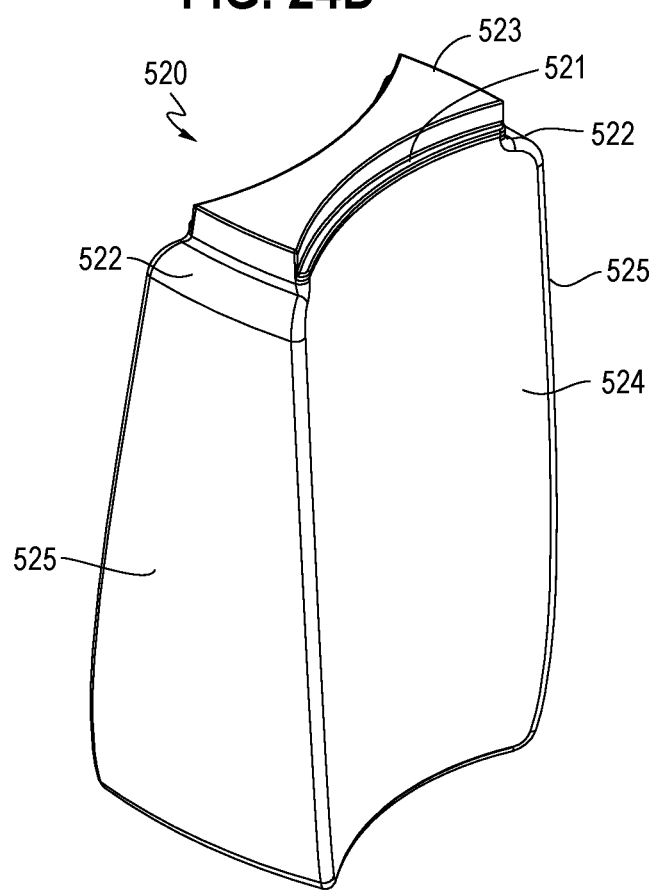

FIG. 24A is a perspective view of another embodiment of a storage container 100 of this disclosure. FIG. 24B is a cross-sectional view of the storage container 100 of FIG. 24A. FIGS. 24C-D show different components of the storage container 100 of FIG. 24A. The storage container 100 in FIG. 24A can be used as a popsicle cup to make two or more popsicles in one batch. The base 410 can be filed with liquid for freeing to create the popsicles. The storage container 100 has a base 410 similar to the base 410 in the other embodiments described above, and the base 410 here may be compatible for use with other components, such as the inner inserts and base caps, of those storage containers 100s. The storage container 100 here may have a first inner insert 510, a second inner insert 520, and a third inner insert 530. The first inner insert 510, the second inner insert 520, and the third inner insert 530 are all removably positionable in the base 410. The second inner insert 520 may be configured as a divider to divide the base 410 into two or more volumes, with side walls 525 contacting the side walls of the base 410. Each of the first inner insert 510 and the third inner insert 530 may include one or more covers 511, 531 and one or more sticks 512, 532. The covers 511 and 531 are shaped and sized to mate with a protrusion 415 of the base 410 and a ledge 521 of the second inner insert 520. For example, a part (such as its ledge) of the covers 511 and 531 is positionable on the ledge 521 and the protrusion 415. The inner insert 520 may have a ridge 523 positioned between the covers 511 and 531 and in contact with the covers 511 and 531. The covers 511, 531 and the ridge 523 may form a compression fit within the side wall of the base 410. The inner insert 520 further includes ledges 522, which are positionable below the protrusion 415, to secure the inner insert 520 within the base 410. The side walls 524 of the inner insert 520 facing the sticks 512, 532 may be curved inwardly to define at least a part of a popsicle formed in the base 410. The side walls 525 of the inner insert 520 between the two side walls 524 may be curved outwardly for engagement with the side wall of the base 410. The inner insert 520 may be a hollow structure. The storage container 100 in FIG. 24A may be used as a popsicle cup.

Figure 24E:
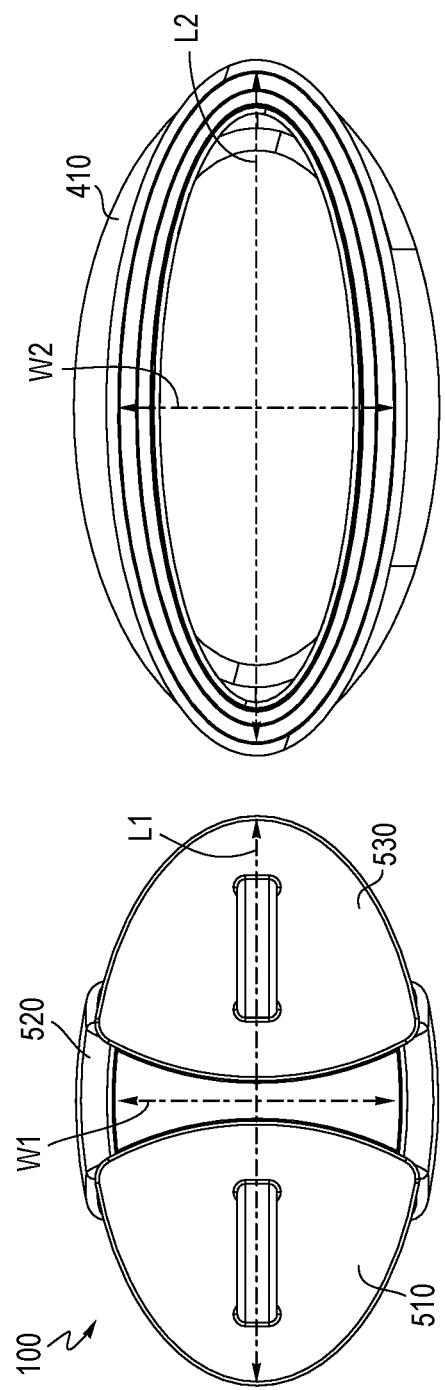
FIG. 24E shows the dimensions of the storage container when the inner inserts are separated from the base.

Like the storage container 100 illustrated in FIG. 21F, the storage container 100 of FIG. 24A has a similar design to create a compression fit between the base 410 and the inner inserts 510, 520, 530 when positioned therein. Specifically, as shown in FIG. 24E, when the inner inserts 510, 520, 530 is separated from the base 410, the width W1 of the inner insert 520 may be larger than the width W2 of the base 410. Likewise, the width of the inner inserts 510, 530 may be larger than corresponding widths of the base 410. Alternatively, or additionally, the length L1 of the inner inserts 510, 520, 530 in combination may be shorter than the length L2 of the base 410. Thus, when the set of the inner inserts 510, 520, 530 is positioned in the base 410, the base 410 (which may comprise an elastomer) may deformed to create a compression fit.

The description above discloses multiple embodiments of storage container 100s with different intended usage applications. In one implementation, any base 410 can be compatible for use with the different components, such as the inner inserts 420 and outer base caps 430 disclosed herein. Therefore, a consumer can use a same base 410 (or set of bases) to combine with different types of inner inserts and base caps 430 depending on the desired usage application. For example, a consumer can purchase a base 410 compatible for use with different inner inserts 420 and base caps 430 for different applications, such as a drinking bottle, a snack pouch, or a popsicle cup. Conveniently, this design also allows the same base 410 to be used for users over a range of different ages and applications, for example, beginning with an infant sippy cup, then as a snack cup or smoothie cup for toddlers, then as a popsicle cup or drinking bottle for youth and/or adults.

Having the design introduced in this disclosure, the structure and material improve the performance of the storage containers toward the goal of leakproof, airtight, freezer/dishwasher/milk warmer/microwave safe, BPA/PVC/Latex free storage containers.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment," "an embodiment," "one aspect," or "an aspect" can mean that a particular feature, structure, or characteristic described in connection with a particular embodiment can be included in at least one embodiment of claimed subject matter. Thus, appearances of the phrase "in one embodiment," "an embodiment," "in on aspect," or "an aspect," in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

The invention claimed is:

1. A storage container comprising:
an elastomeric base having a plurality of side walls forming an interior and an opening at an upper edge of the base, the base comprising an annular channel positioned proximate the opening at the upper edge of the base;
an inner insert removably positionable in the opening of the base, the inner insert comprising an outward facing annular protrusion configured for insertion in the annular channel of the base, and a spout with a channel formed therethrough, at least a portion of the spout having external threading, and;
an outer cap positionable over the inner insert, the cap comprising an opening for receiving the spout; and,
a screw cap comprising internal threading, the internal threading configured for rotational engagement with the external threading of the spout, wherein rotation of screw cap compresses at least a portion of the base between the inner insert and the outer cap.

2. The storage container of claim 1, wherein the base further comprises an inward facing annular protrusion configured to engage a lower surface of the inner insert.

3. The storage container of claim 1, wherein the base further comprises an inward facing annular protrusion proximate the opening, the inward facing annual protrusion proximate the opening received between and in contact with the inner insert and the outer cap.

4. The storage container of claim 3, wherein the inner insert comprises an annular channel configured to receive an annular shoulder extending downward from the inward facing annular protrusion proximate the opening.

5. The storage container of claim 1, wherein the outer cap comprises a downward facing annular skit configured to compress at least a portion of the base.

6. The storage container of claim 5, further comprising an inward facing annular protrusion proximate the opening and having an annular step extending upward from the inward facing annular protrusion proximate the opening, the annular step positioned between the downward facing annular skirt and the inner insert.

7. The storage container of claim 1, wherein the outer cap comprises a downward facing outer skirt configured to compress at least a portion of the base between the outer skirt and the inner insert.

8. The storage container of claim 1, further comprising a spout cap removably attachable to the spout, the spout cap connected via an arm to a ring surrounding the spout.

9. The storage container of claim 8, further comprising a spoon bowl extending from the spot cap, the spoon bowl being in fluid communication with an interior of the spout cap via a channel extending therethrough.

10. The storage container of claim 1, further comprising a bi-directional valve positioned in the spout.

11. The storage container of claim 1, wherein the elastomeric base comprises silicone.

12. The storage container of claim 1, wherein the plurality of side walls of the elastomeric base form a generally elliptical cross-sectional shape.

13. A storage container system comprising:
an elastomeric base having a plurality of side walls forming an interior and an opening at an upper edge of the base, the base comprising:
an inward facing annular protrusion proximate the opening;
an annular channel positioned proximate the opening at the upper edge of the base, the annular channel configured to receive an outward facing annular protrusion on an inner insert removably positionable in the opening of the base; and,
a second inward facing annular protrusion configured to engage a lower surface of the inner insert;
wherein the base further comprises an annular rib extending upward from the inward facing annular protrusion proximate the opening.

14. The storage system of claim 13, further comprising the inner insert, the inner insert positionable in the opening of the base to expand the opening and create a compression fit within the base.

15. The storage system of claim 14, wherein the inner insert is connected to at least one popsicle stick.

16. The storage system of claim 14, wherein the inner insert comprises a removable lid or cover moveable relative to the inner insert for access to the interior of the base.

17. The storage system of claim 13, further comprising the inner insert, the inner insert comprising a spout with a channel formed therethrough.

18. The storage system of claim 17, further comprising an outer cap positionable over the inner insert and a screw cap having internal threading, the internal threading configured for rotational engagement with external threading on the spout, wherein rotation of screw cap compresses at least a portion of the base between the inner insert and the outer cap.

19. The storage system of claim 17, further comprising a spout cap removably connectable to the spout, the spout cap associated with an arm and a ring for surrounding the spout.

20. The storage system of claim 17, further comprising a spout cap removably connectable to the spout, the spout cap having a spoon bowl extending from the spot cap, the spoon bowl being in fluid communication with an interior of the spout cap via a channel extending therethrough.

21. The storage container system of claim 13, wherein the elastomeric base comprises silicone.

22. The storage container system of claim 13, wherein the plurality of side walls of the elastomeric base form a generally elliptical cross-sectional shape.

23. A storage container system comprising:
an elastomeric base having a plurality of side walls forming an interior and an opening at an upper edge of the base, the base comprising:
an inward facing annular protrusion proximate the opening;
an annular channel positioned proximate the opening at the upper edge of the base, the annular channel configured to receive an outward facing annular protrusion on an inner insert removably positionable in the opening of the base; and,
a second inward facing annular protrusion configured to engage a lower surface of the inner insert; and,
wherein the base further comprises an annular shoulder extending downward from the inward facing annular protrusion proximate the opening.

24. The storage system of claim 23, further comprising the inner insert, the inner insert positionable in the opening of the base to expand the opening and create a compression fit within the base.

25. The storage system of claim 24, wherein the inner insert is connected to at least one popsicle stick.

26. The storage system of claim 24, wherein the inner insert comprises a removable lid or cover moveable relative to the inner insert for access to the interior of the base.

27. The storage system of claim 23, further comprising the inner insert, the inner insert comprising a spout with a channel formed therethrough.

28. The storage system of claim 27, further comprising an outer cap positionable over the inner insert and a screw cap having internal threading, the internal threading configured for rotational engagement with external threading on the spout, wherein rotation of screw cap compresses at least a portion of the base between the inner insert and the outer cap.

29. The storage system of claim 27, further comprising a spout cap removably connectable to the spout, the spout cap associated with an arm and a ring for surrounding the spout.

30. The storage system of claim 27, further comprising a spout cap removably connectable to the spout, the spout cap having a spoon bowl extending from the spot cap, the spoon bowl being in fluid communication with an interior of the spout cap via a channel extending therethrough.

31. The storage container system of claim 23, wherein the elastomeric base comprises silicone.

32. The storage container system of claim 23, wherein the plurality of side walls of the elastomeric base form a generally elliptical cross-sectional shape.

\* \* \* \* \*